(12) United States Patent
Lee

(10) Patent No.: US 10,042,534 B2
(45) Date of Patent: Aug. 7, 2018

(54) MOBILE TERMINAL AND METHOD TO CHANGE DISPLAY SCREEN

(71) Applicant: LG ELECTRONICS INC., Seoul (KR)

(72) Inventor: Namsu Lee, Seoul (KR)

(73) Assignee: LG Electronics Inc., Seoul (KR)

(*) Notice: Subject to any disclaimer, the term of this patent is extended or adjusted under 35 U.S.C. 154(b) by 6 days.

(21) Appl. No.: 15/150,491

(22) Filed: May 10, 2016

(65) Prior Publication Data

US 2016/0253076 A1     Sep. 1, 2016

Related U.S. Application Data

(63) Continuation of application No. 13/782,055, filed on Mar. 1, 2013, now Pat. No. 9,360,952.

(30) Foreign Application Priority Data

Mar. 8, 2012   (KR) ........................ 10-2012-0023978

(51) Int. Cl.
| | | |
|---|---|---|
| *H04M 1/00* | (2006.01) | |
| *G06F 3/0484* | (2013.01) | |
| *G06F 3/041* | (2006.01) | |
| *G06F 3/0488* | (2013.01) | |
| *G06F 3/0354* | (2013.01) | |

(Continued)

(52) U.S. Cl.
CPC ...... *G06F 3/04845* (2013.01); *G06F 3/03547* (2013.01); *G06F 3/041* (2013.01); *G06F 3/0482* (2013.01); *G06F 3/04817* (2013.01); *G06F 3/04883* (2013.01); *G06F 3/04886* (2013.01);

(Continued)

(58) Field of Classification Search
CPC ... G06F 3/041; G06F 3/04883; G06F 3/04886
See application file for complete search history.

(56) References Cited

U.S. PATENT DOCUMENTS

| | | |
|---|---|---|
| 5,455,906 A | 10/1995 | Usuda |
| 8,493,338 B2 | 7/2013 | Nakajoh |

(Continued)

FOREIGN PATENT DOCUMENTS

| | | |
|---|---|---|
| CN | 101132571 | 2/2008 |
| CN | 101382868 | 3/2009 |

(Continued)

OTHER PUBLICATIONS

European Search Report dated May 7, 2013 issued in Application No. 13 00 1047.

(Continued)

*Primary Examiner* — Keith Fang
(74) *Attorney, Agent, or Firm* — KED & Associates LLP

(57) ABSTRACT

A mobile terminal and a control method thereof are disclosed. The mobile terminal includes: a touch screen configured to acquire a user's touch action; and a controller configured to display a control window for performing manipulations on content displayed on the touch screen, based on at least either one of the position and trace of the acquired touch action. Accordingly, the mobile terminal can be manipulated more easily by displaying a control window for performing manipulations on content displayed on a touch screen, based on at least either one of the position and trace of a touch action.

12 Claims, 32 Drawing Sheets

(51) Int. Cl.
*G06F 3/0481* (2013.01)
*G06F 3/0482* (2013.01)
*H04M 1/725* (2006.01)

(52) U.S. Cl.
CPC .......... *H04M 1/72583* (2013.01); *G06F 2203/04803* (2013.01)

(56) References Cited

U.S. PATENT DOCUMENTS

| | | | |
|---|---|---|---|
| 2004/0212617 A1* | 10/2004 | Fitzmaurice | G06F 3/0481 345/440 |
| 2007/0008300 A1 | 1/2007 | Yang et al. | |
| 2008/0239132 A1 | 10/2008 | Kohama | |
| 2009/0070670 A1 | 3/2009 | Kishi | |
| 2009/0295743 A1 | 12/2009 | Nakajoh | |
| 2010/0004031 A1* | 1/2010 | Kim | H04M 1/274525 455/566 |
| 2011/0239157 A1 | 9/2011 | Lin et al. | |
| 2013/0009903 A1 | 1/2013 | Shiota | |
| 2014/0160073 A1 | 6/2014 | Matsuki | |

FOREIGN PATENT DOCUMENTS

| | | |
|---|---|---|
| CN | 101656791 | 2/2010 |
| CN | 101910997 | 12/2010 |
| JP | 2009/169820 | 7/2009 |
| JP | 2009-294725 | 12/2009 |
| KR | 2007-006477 | 1/2007 |
| KR | 10-2011-0018589 | 2/2011 |
| KR | 2011/0115683 | 10/2011 |
| KR | 10-2012-0094728 | 8/2012 |
| KR | 10-2012-0139893 | 12/2012 |
| KR | 10-2013-0023948 | 3/2013 |
| KR | 10-2013-0052416 | 5/2013 |
| KR | 10-2013-0061993 | 6/2013 |
| KR | 10-2013-0063325 | 6/2013 |
| KR | 10-2013-0078236 | 7/2013 |
| TW | 2011-33327 | 10/2011 |
| WO | WO 2004/063862 | 7/2004 |

OTHER PUBLICATIONS

Chinese Office Action dated Sep. 4, 2014 issued in Application No. 201310075236.7 and full English language translation.
U.S. Office Action dated Oct. 9, 2014 issued in co-pending U.S Appl. No. 13/782,055.
Korean Office Action dated Nov. 7, 2014 issued in Application 10-2012-0023978.
Korean Notice of Allowance dated Feb. 4, 2015 issued in Application 10-2012-0023978.
U.S. Office Action dated Jul. 20, 2015 issued in co-pending U.S. Appl. No. 13/782,055.
U.S. Office Action dated Oct. 8, 2015 issued in co-pending U.S. Appl. No. 13/782,055.
Korean Notice of Allowance issued in Application 10-2014-0183582 dated Jan. 2, 2018 (full Korean text).

* cited by examiner

FIG. 10
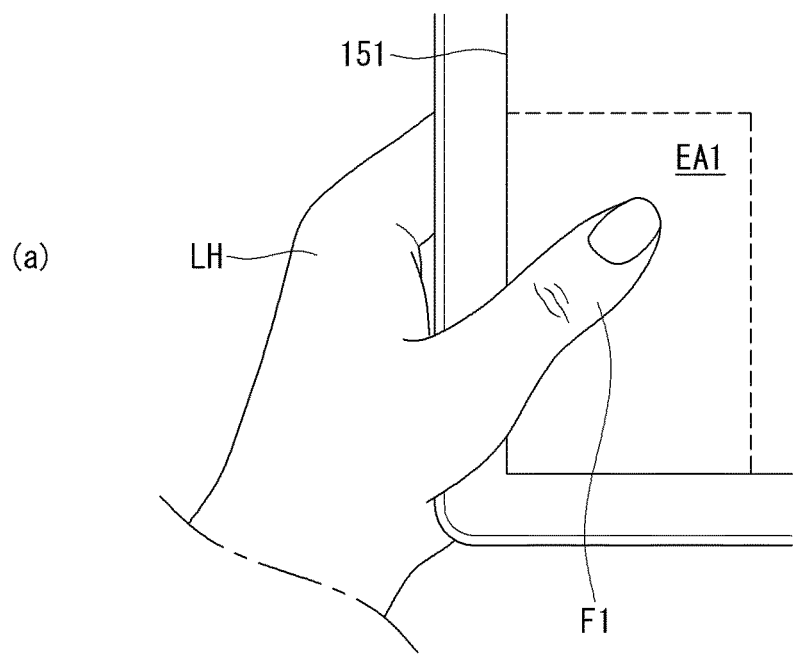
(a)
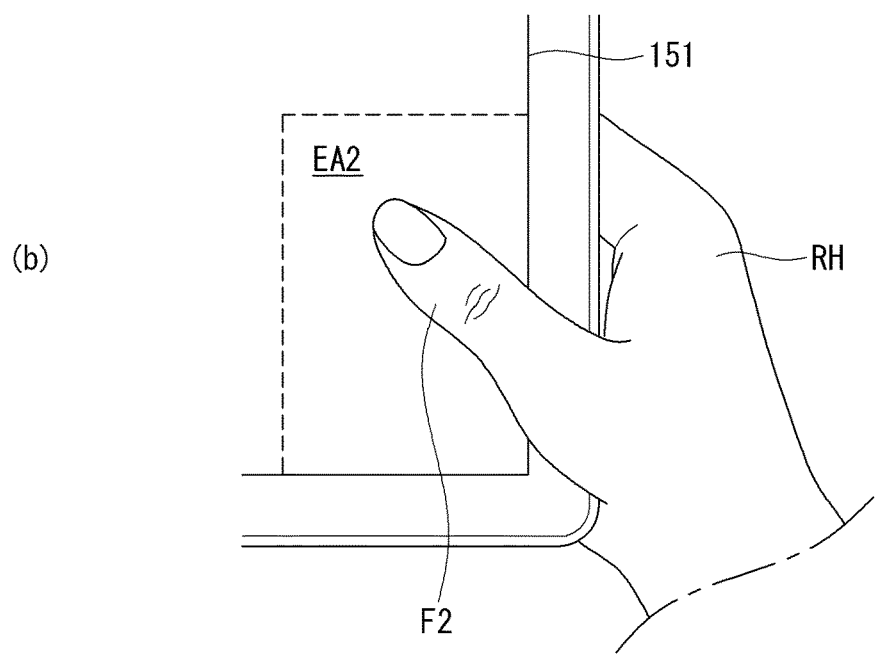
(b)

FIG. 12
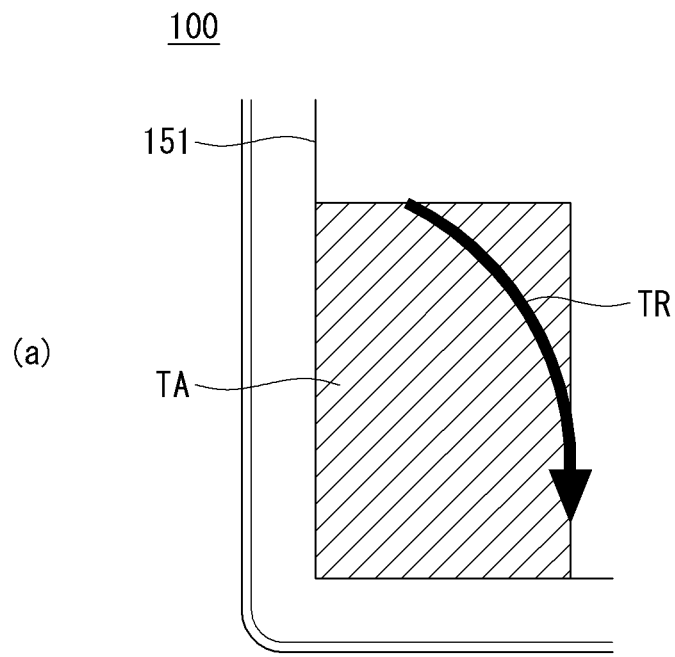
(a)
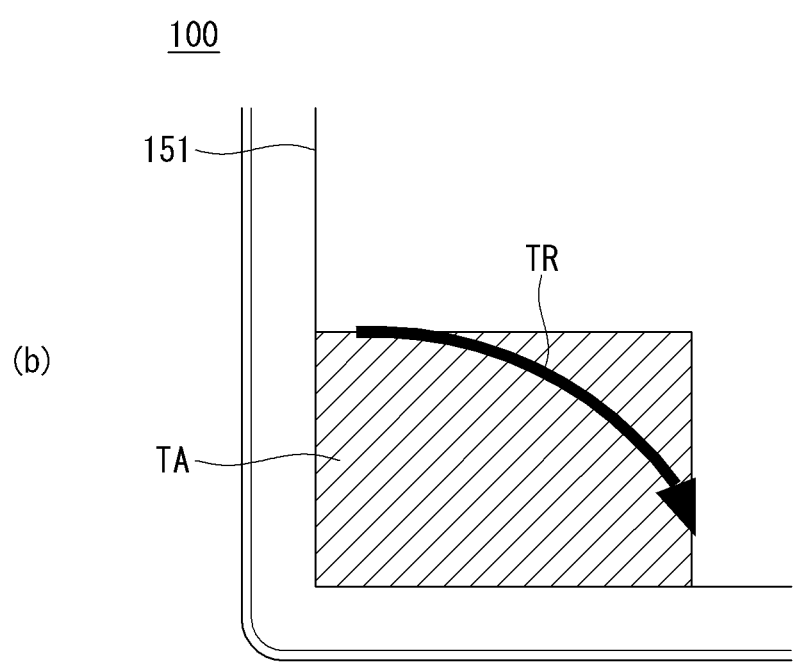
(b)

FIG. 13
(a) 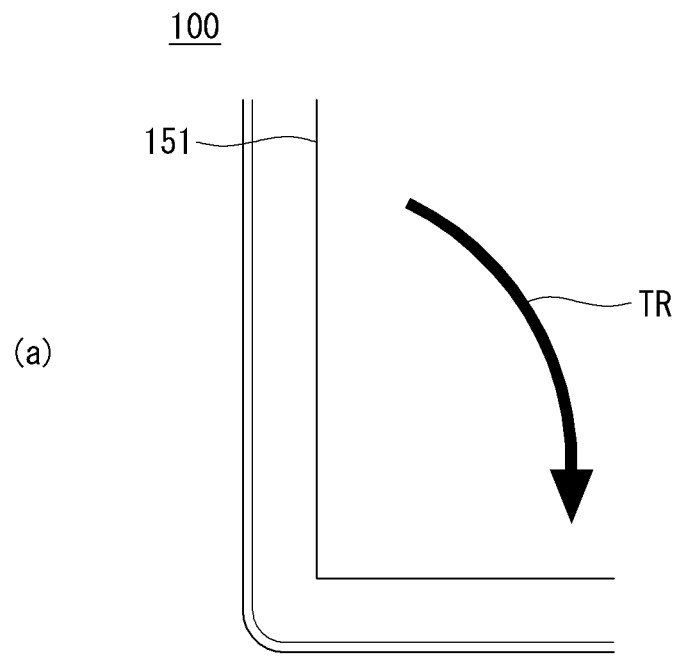
(b) 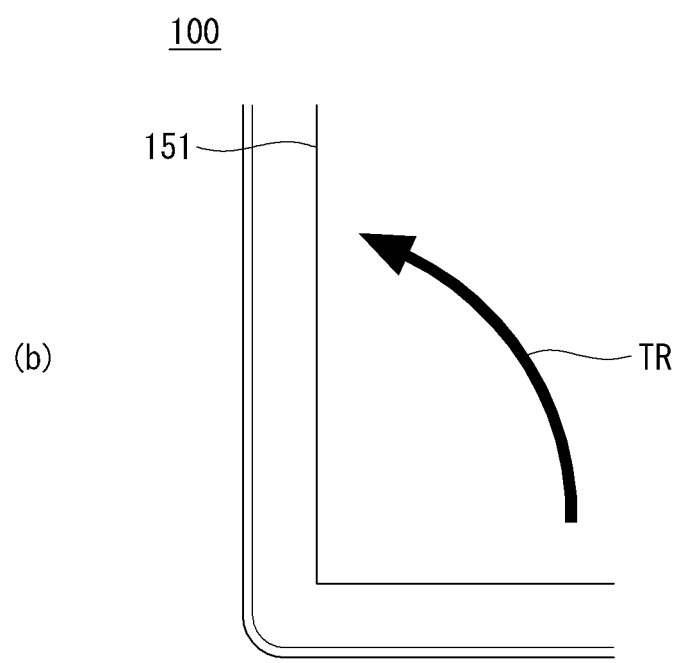

FIG. 15
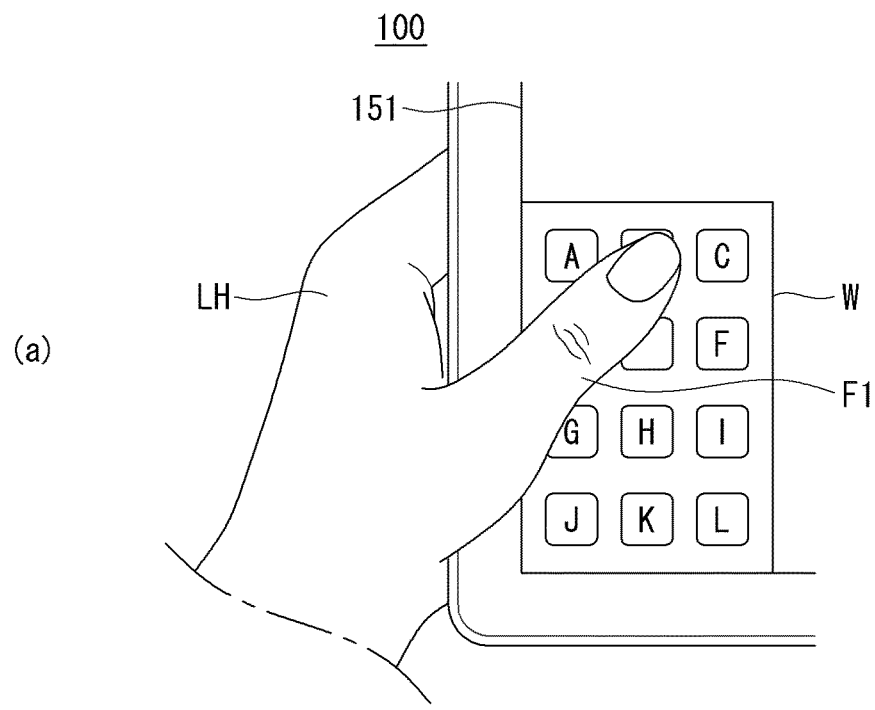
(a)
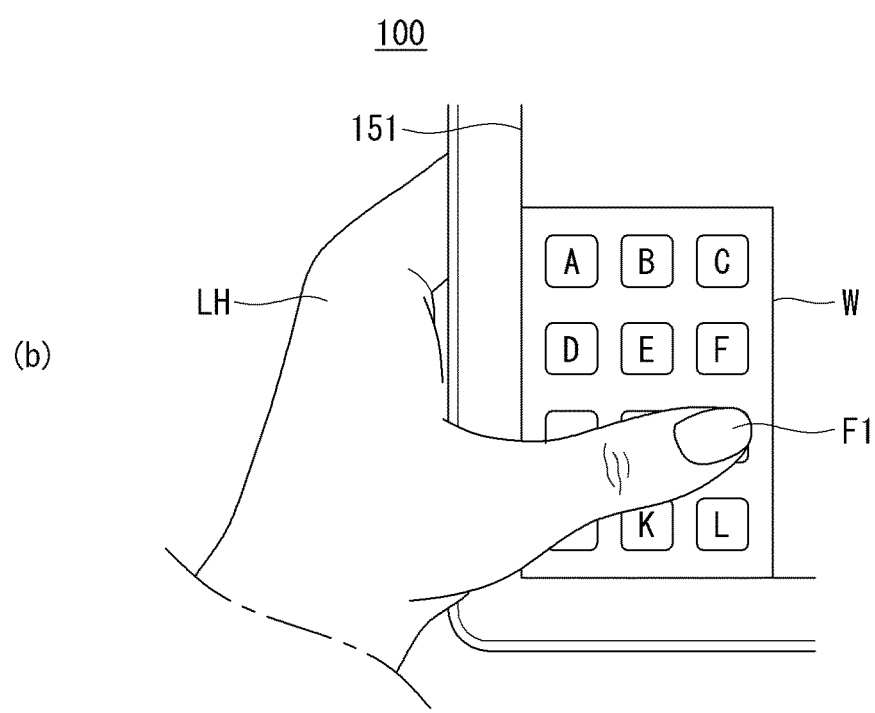
(b)

FIG. 23
(a)
(b)
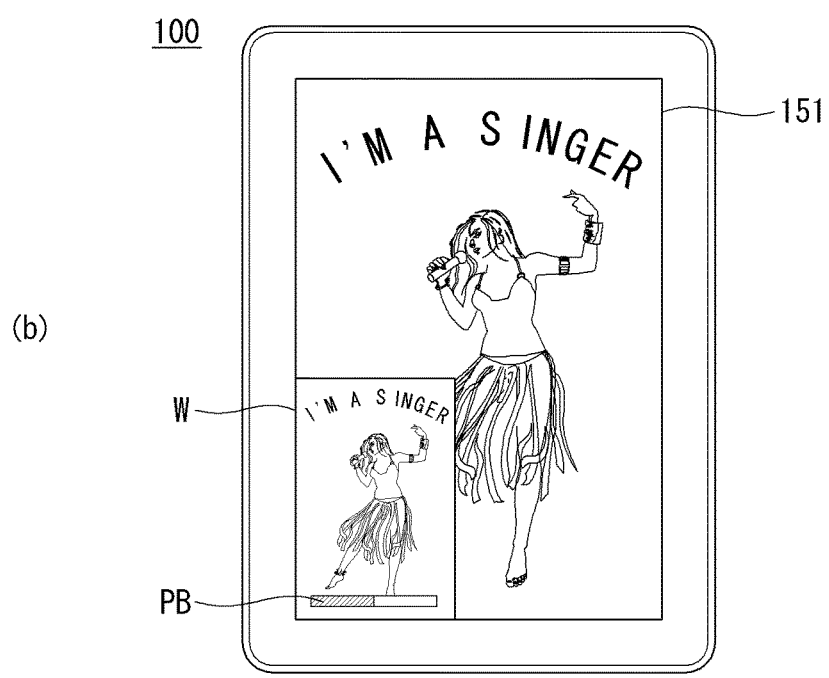

FIG. 24
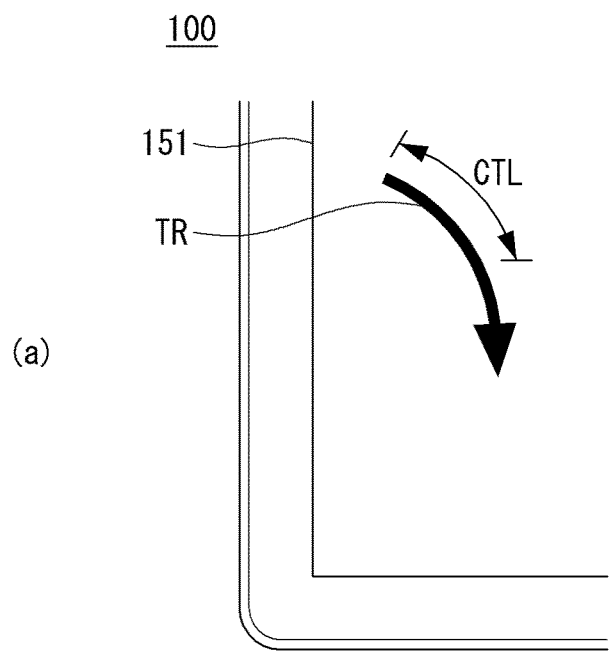
(a)
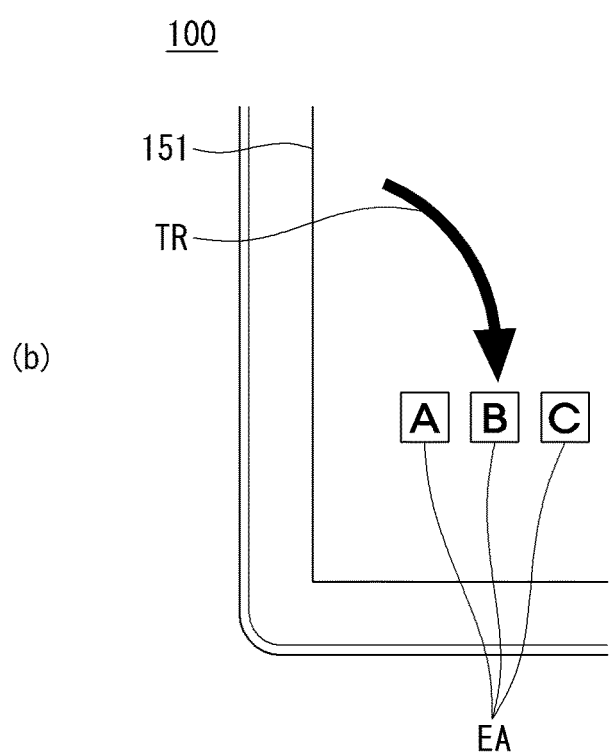
(b)

FIG. 25
(a) 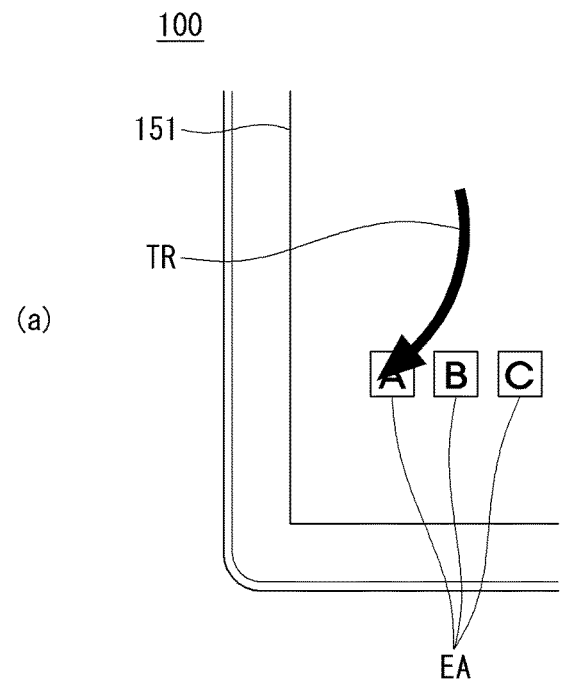
(b) 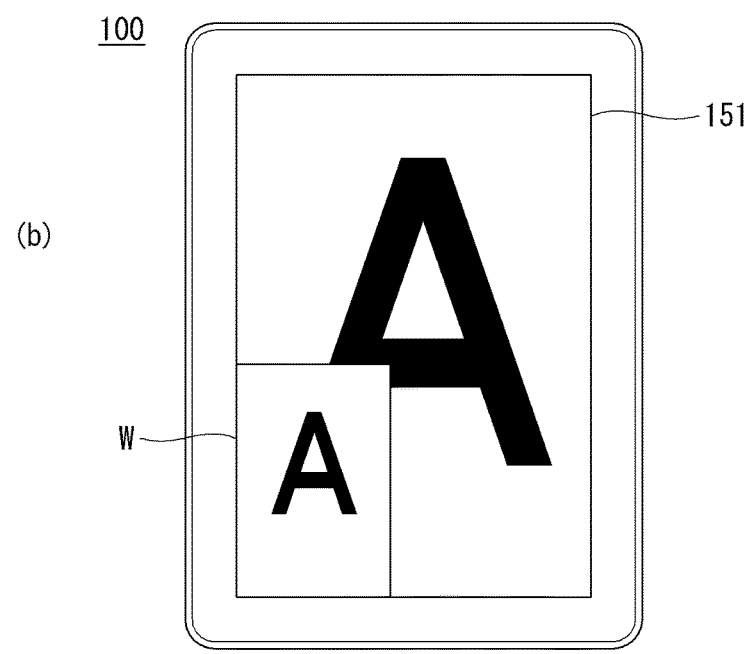

FIG. 26
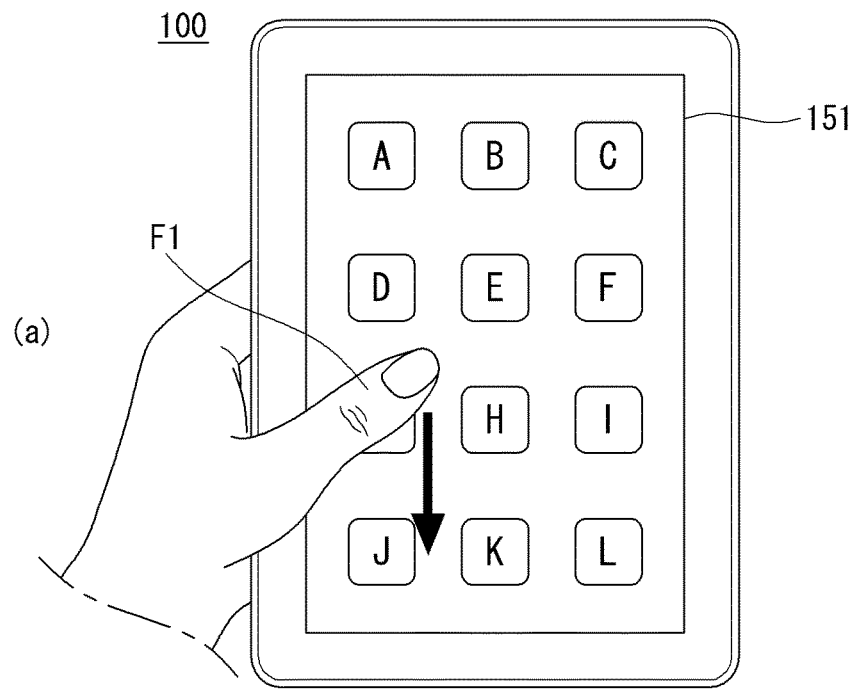
(a)
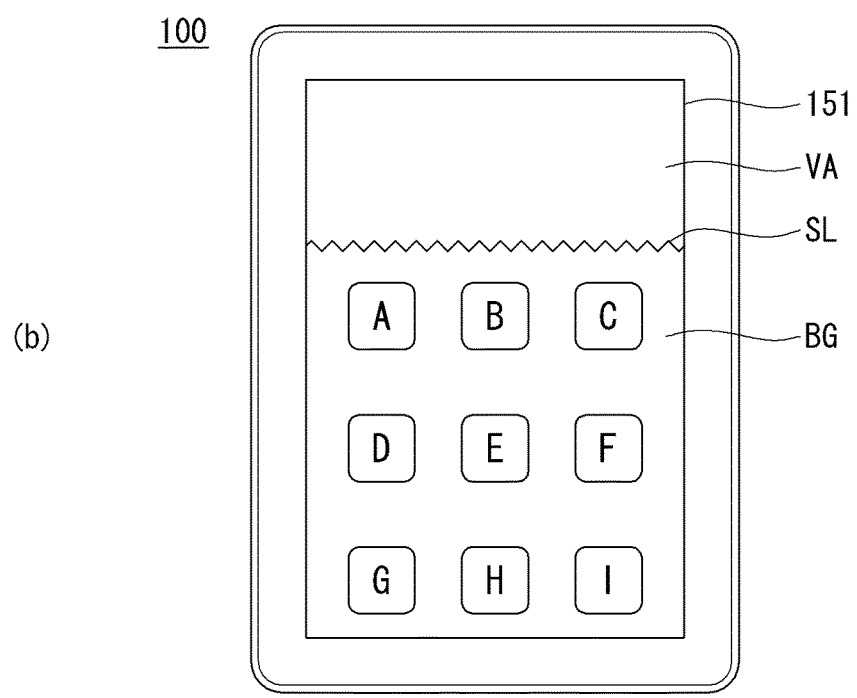
(b)

FIG. 29
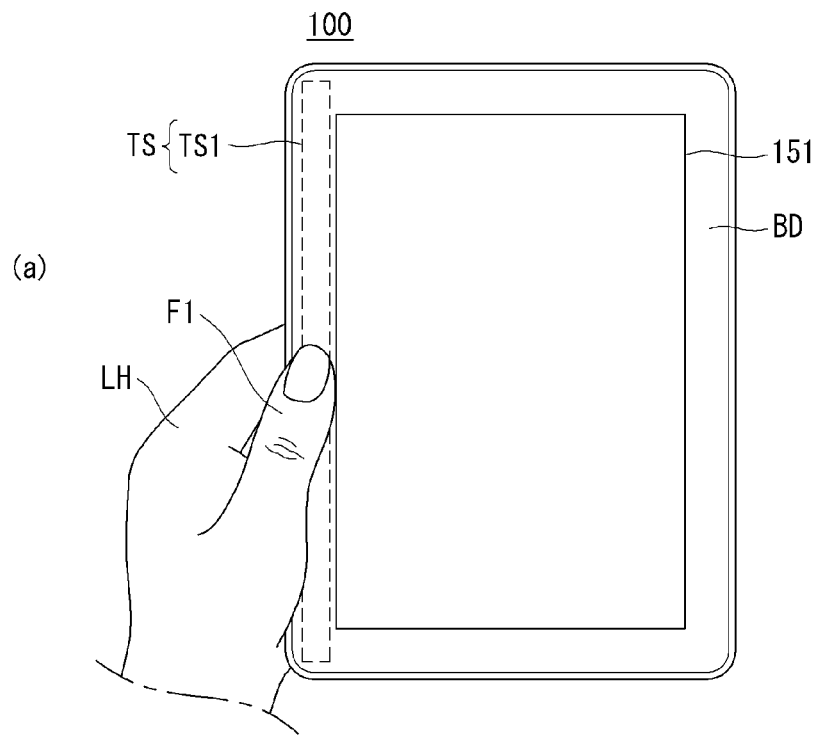
(a)
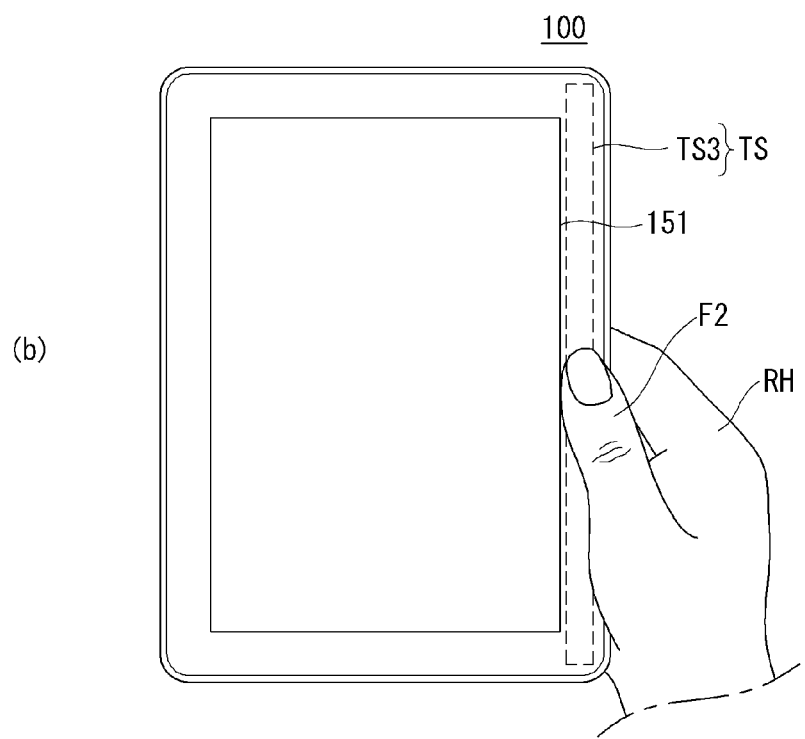
(b)

FIG. 31
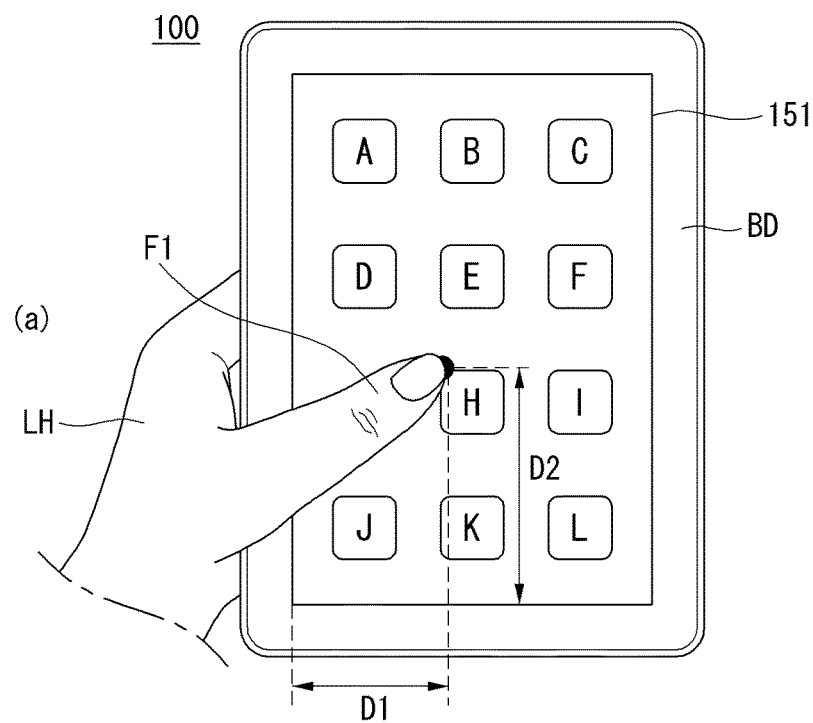
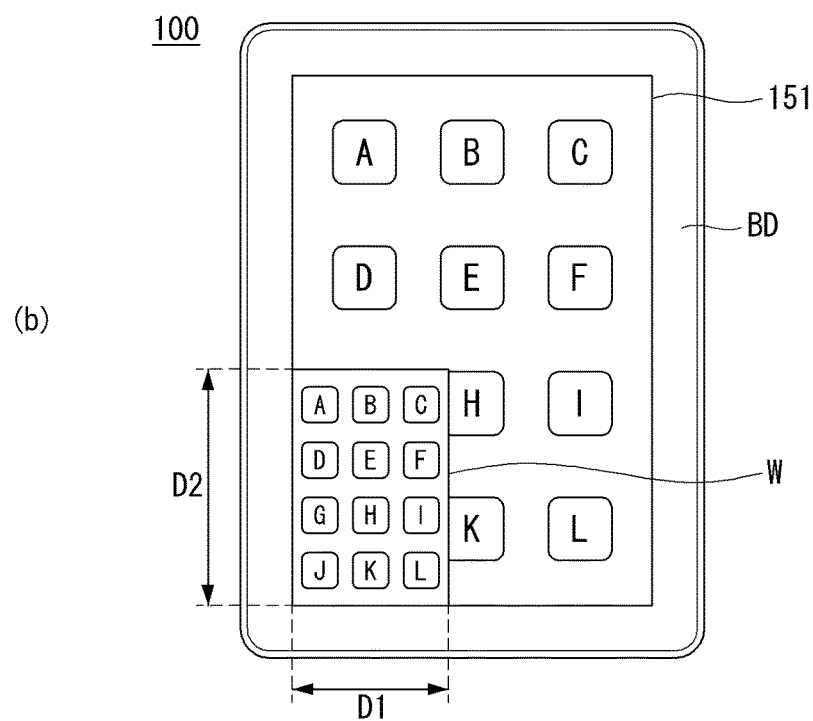

FIG. 32
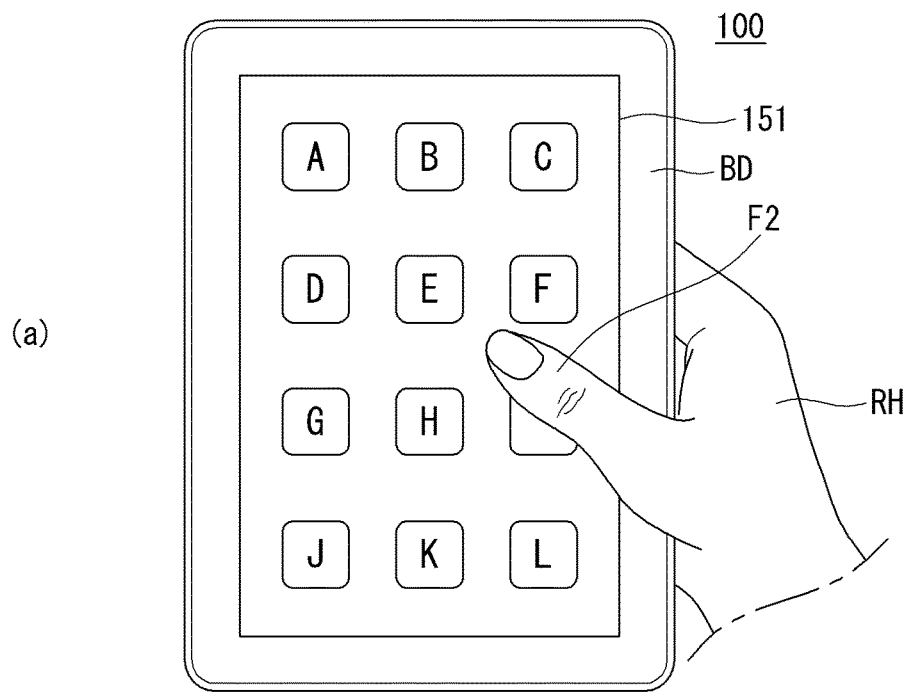
(a)
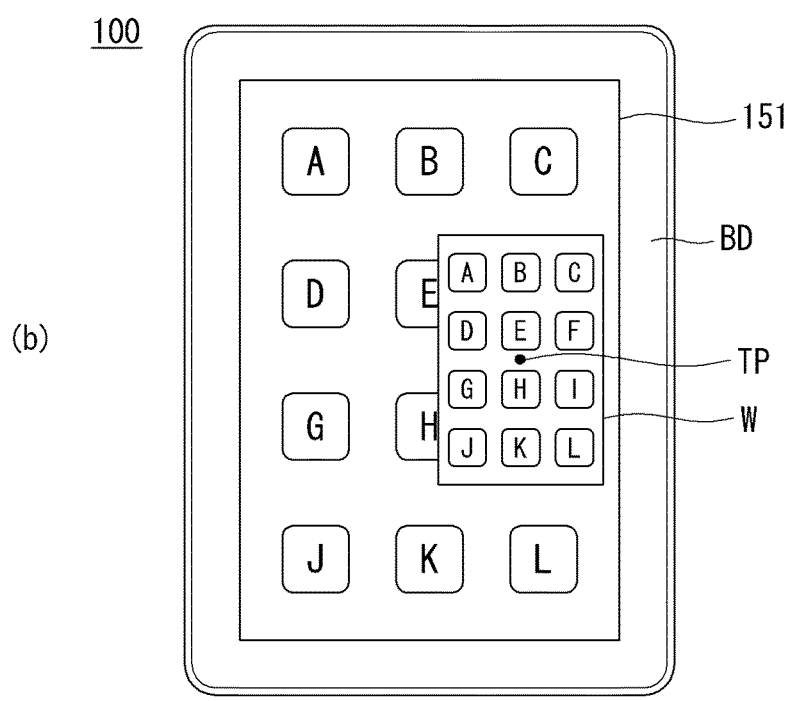
(b)

MOBILE TERMINAL AND METHOD TO CHANGE DISPLAY SCREEN

CROSS-REFERENCE TO RELATED APPLICATIONS

The present application is a Continuation of co-pending U.S. patent application Ser. No. 13/782,055 filed on Mar. 1, 2013, which claims priority under 35 U.S.C. § 119(a) to Korean Patent Application No. 10-2012-0023978, filed on Mar. 8, 2012, whose entire disclosures are hereby incorporated by reference.

TECHNICAL FIELD

The present invention relates to a mobile terminal, and more particularly, to a mobile terminal which can be manipulated more easily by displaying a control window for performing manipulations on content displayed on a touch screen, based on at least either one of the position and trace of a touch action.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

In recent years, displays for mobile terminals show the trend of becoming larger and larger in size to represent various information.

SUMMARY

The present invention relates to a mobile terminal which can be manipulated more easily by displaying a control window for performing manipulations on content displayed on a touch screen, based on at least either one of the position and trace of a touch action, and a control method thereof.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 10 to 13 are views showing a touch action on the mobile terminal of FIG. 1;

FIGS. 14 to 16 are views showing a control window being displayed by a touch action on the mobile terminal of FIG. 1;

FIG. 23 is a view showing a video operation method for the mobile terminal of FIG. 1;

FIGS. 24 and 25 are view showing an application selection method for the mobile terminal of FIG. 1;

FIGS. 26 and 27 are views showing a background operation method for the mobile terminal of FIG. 1;

FIG. 29 is a view showing the mobile terminal of FIG. 28 being held in a hand;

FIG. 31 is a view showing an operation of a mobile terminal according to a further embodiment of the present invention; and FIG. 32 is a view showing an operation of a mobile terminal according to a further embodiment of the present invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
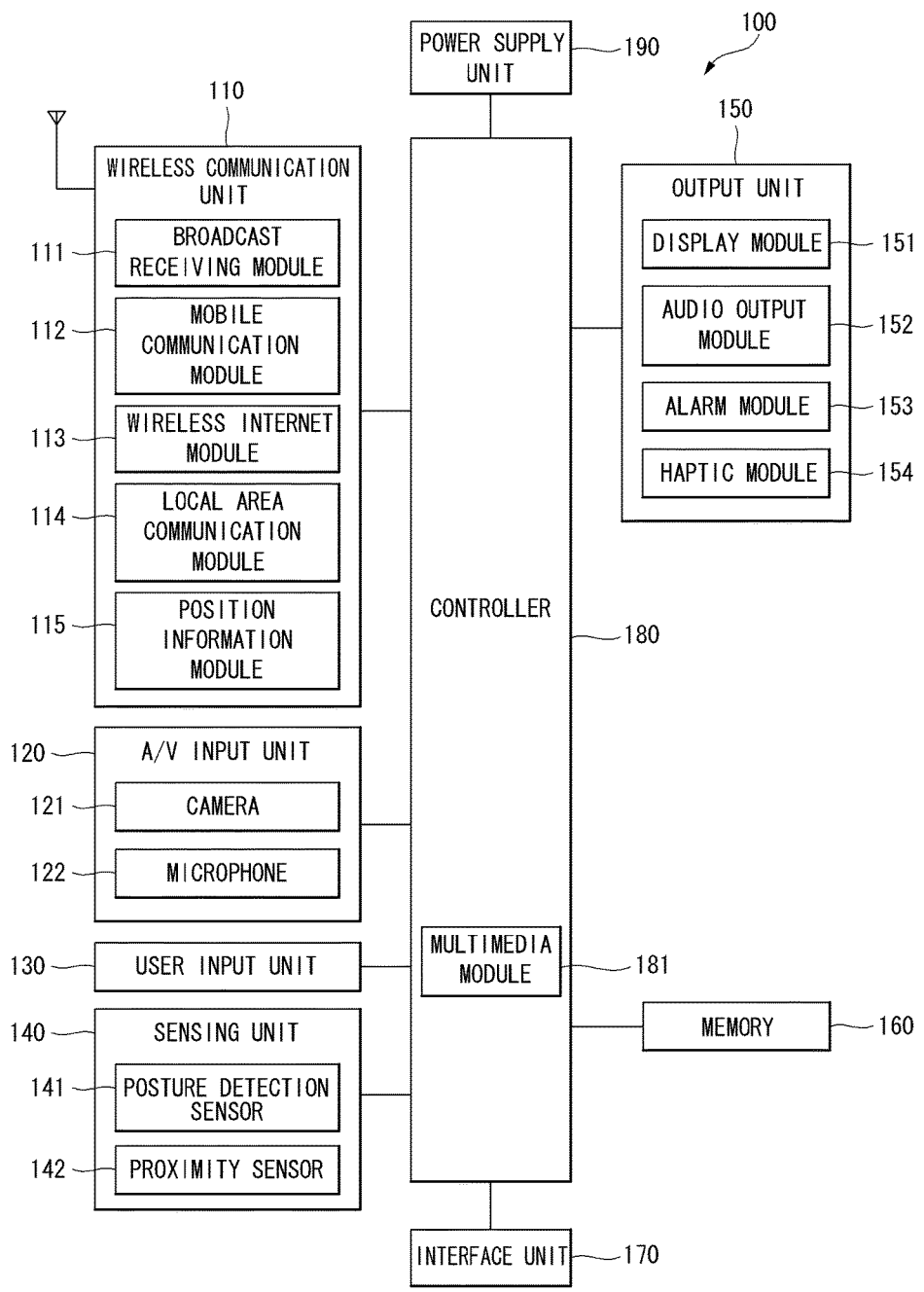
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (NV) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
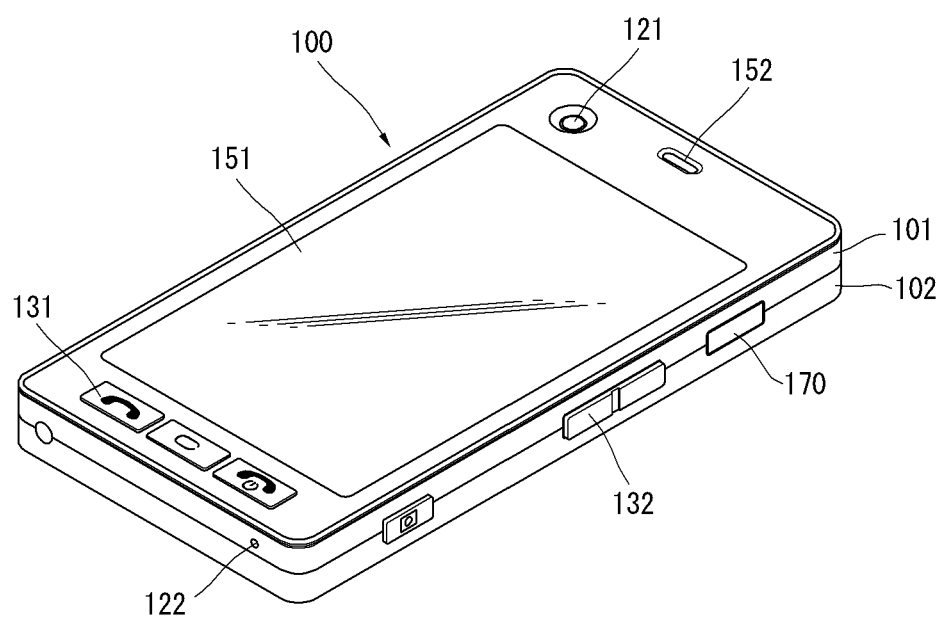
FIG. 2 is a front perspective view of the mobile terminal according to an embodiment.

FIG. 2 is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 3:
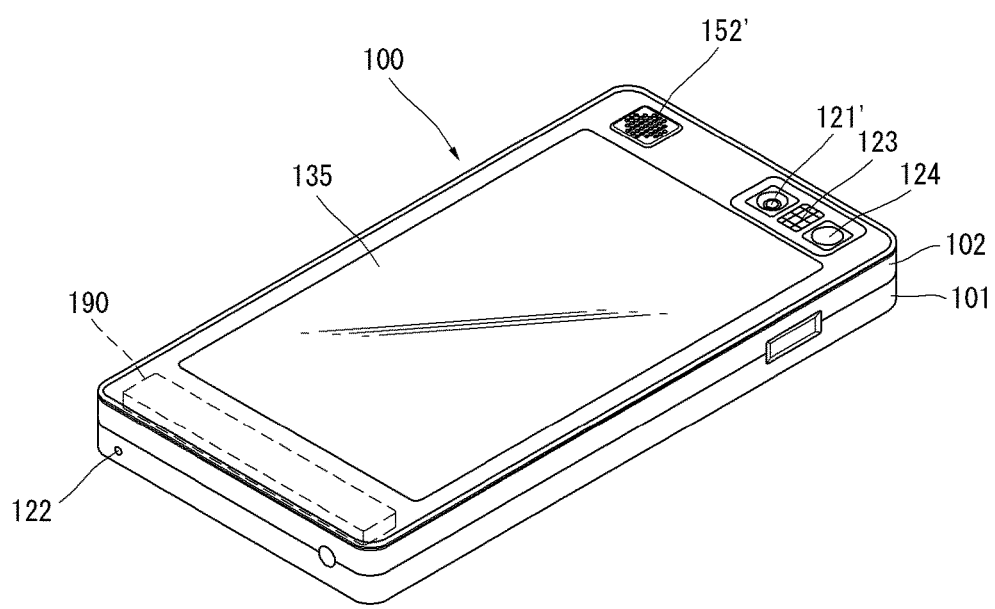
FIG. 3 is a rear perspective view of the mobile terminal according to an embodiment.

FIG. 3 is a rear perspective view of the mobile terminal (shown in FIG. 2) according to an embodiment.

Referring to FIG. 2, a camera 121' may be additionally attached to the rear side of the terminal body (i.e., the rear case 102). The camera 121' may have a photographing direction opposite to that of the camera 121 (shown in FIG. 2) and may have pixels different from those of the camera 121 (shown in FIG. 2).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 4:
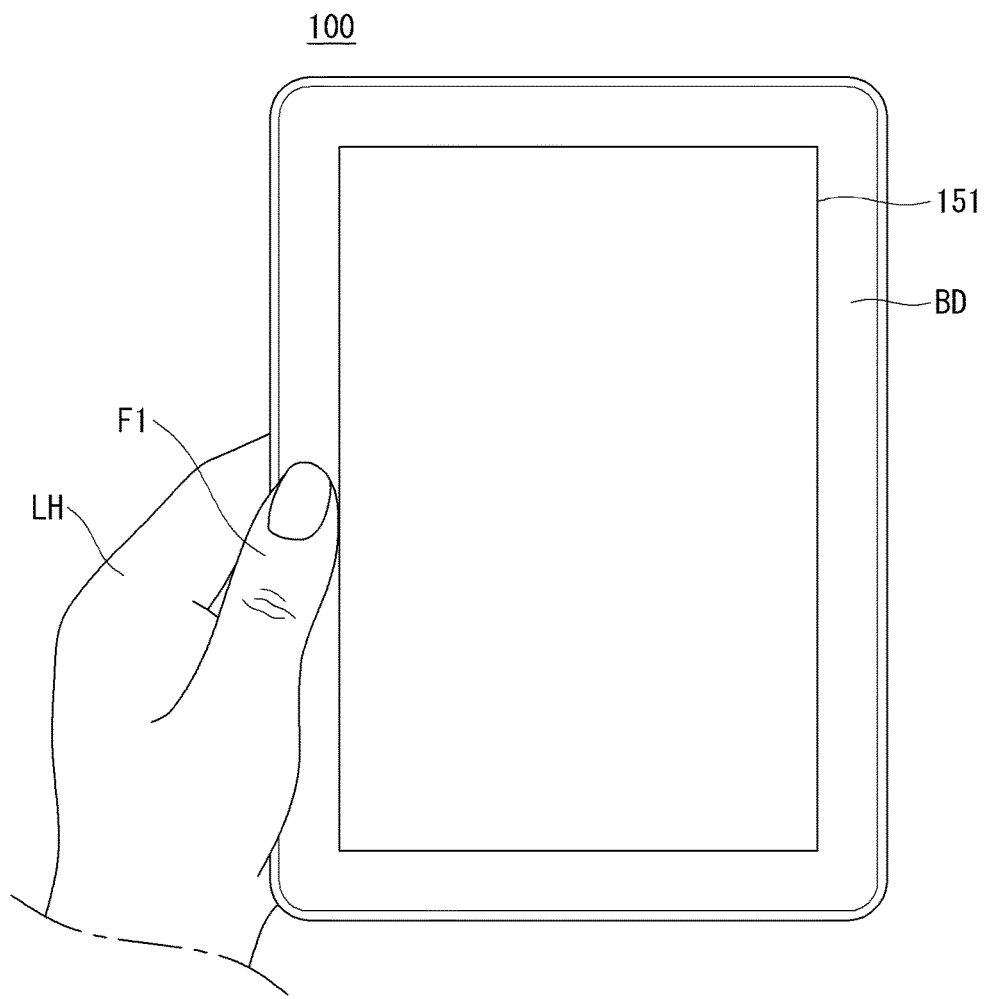
FIG. 4 is a front perspective view of a mobile terminal according to another embodiment of the present invention.

FIG. 4 is a front perspective view of a mobile terminal according to another embodiment of the present invention.

As shown therein, the mobile terminal 100 according to another embodiment of the present invention may be configured such that the display 151 has a larger area than a conventional one. The user may manipulate the mobile terminal 100 while holding it.

The display 151 may be a touch screen. That is, the mobile terminal 100 may be manipulated by touching the display 151.

The user may manipulate the mobile terminal 100 while holding it. For example, the user may perform an operation of touching a specific portion of the display 151 with the right hand (not shown) while holding a bezel (BD) portion with the left hand (LH).

Only the first finger F1 of the left hand LH holding the mobile terminal 100 may be actually used for a touch operation. That is, the first finger F1, i.e., the thumb, may be used to touch the display 151 while the mobile terminal 100 is being held in the four fingers of the left hand LH.

When touching the display 151 with the first finger F1, the touch range of the first finger F1 may be limited. That is, unless the hand holding the mobile terminal 100 is switched, a touch operation using the first finger F1 is limited when the mobile terminal 100 is being held in the left hand LH. For example, a touch operation using the first finger F1 may be performed only within the radius of the first finger F1. According to the mobile terminal 100 according to one embodiment of the present invention, it is possible to make efficient use of the mobile terminal 100 even if the area of the display 151 is larger than the radius of a specific finger of the hand holding the mobile terminal 100.

Figure 5:
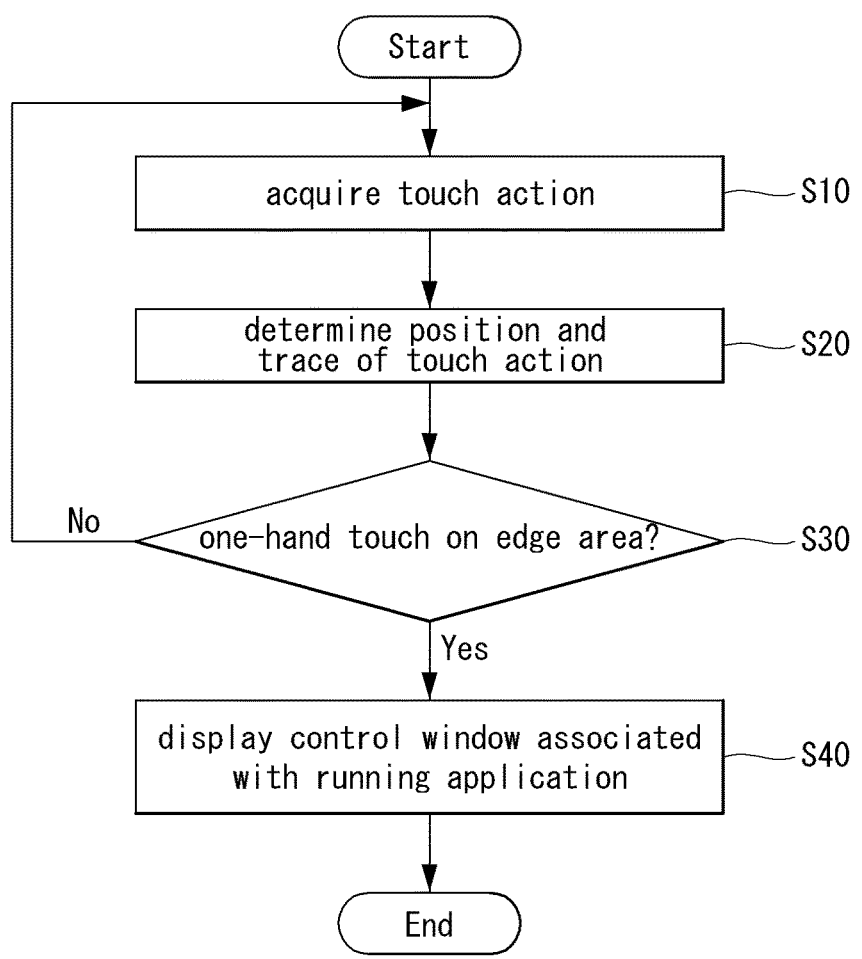
FIG. 5 is a flowchart showing an operational procedure of the mobile terminal of FIG. 1.

FIG. 5 is a flowchart showing an operational process of the mobile terminal of FIG. 1.

As shown therein, the controller 180 of the mobile terminal according to one embodiment of the present invention may perform the step S10 of acquiring a touch action.

The touch action refers to the user's performing touches on the display 151, including a touch-down, a touch-up, a touch and drag, etc. Further, the touch action may include a non-contact touch on the display 151. For example, when the user moves a finger spaced away a predetermined distance from the display 151, a corresponding touch signal may be generated.

The step s20 of determining the position and trace of a touch action may be performed.

When a touch action is performed, the controller 180 may determine the position and trace of the touch action. For example, the position and trace of a touch action may be determined based on at which position a touch-up occurs, whether there is a change of the touch point during a touch-up after a touch-down, and so on.

The step S30 of determining whether a one-hand touch has occurred to an edge area, based on the determined position and trace of the touch action, may be performed.

The edge area may be a portion other than the central area of the display 151. That is, the edge area may be an area closer to the four edges of the display 151 having a substantially rectangular shape.

If the position and trace of the touch action involves a specific touch on an edge area of the display 151, the controller 180 may determine that a one-hand touch action has occurred. That is, the controller 180 may determine that a touch action has been performed with a finger of the hand holding the mobile terminal 100. For example, if the position of the touch action is an edge area, and the trajectory of the touch action takes the shape of an arc corresponding to the radius of the finger within the edge area, it will be considered that a one-hand touch action has occurred.

When a one-hand touch action is performed, the step s40 of displaying a control window associated with a running application may be performed.

When a one-hand touch action is performed, the controller 180 may perform an operation optimized for the one-hand touch action. That is, the controller 180 may provide a user interface environment where the display 151 having a large area, compared to the length of the fingers of holding the mobile terminal 100, can be properly touched. Because the display 151 can be manipulated with the fingers holding the mobile terminal 100, the mobile terminal 100 can be used conveniently.

Figure 6:
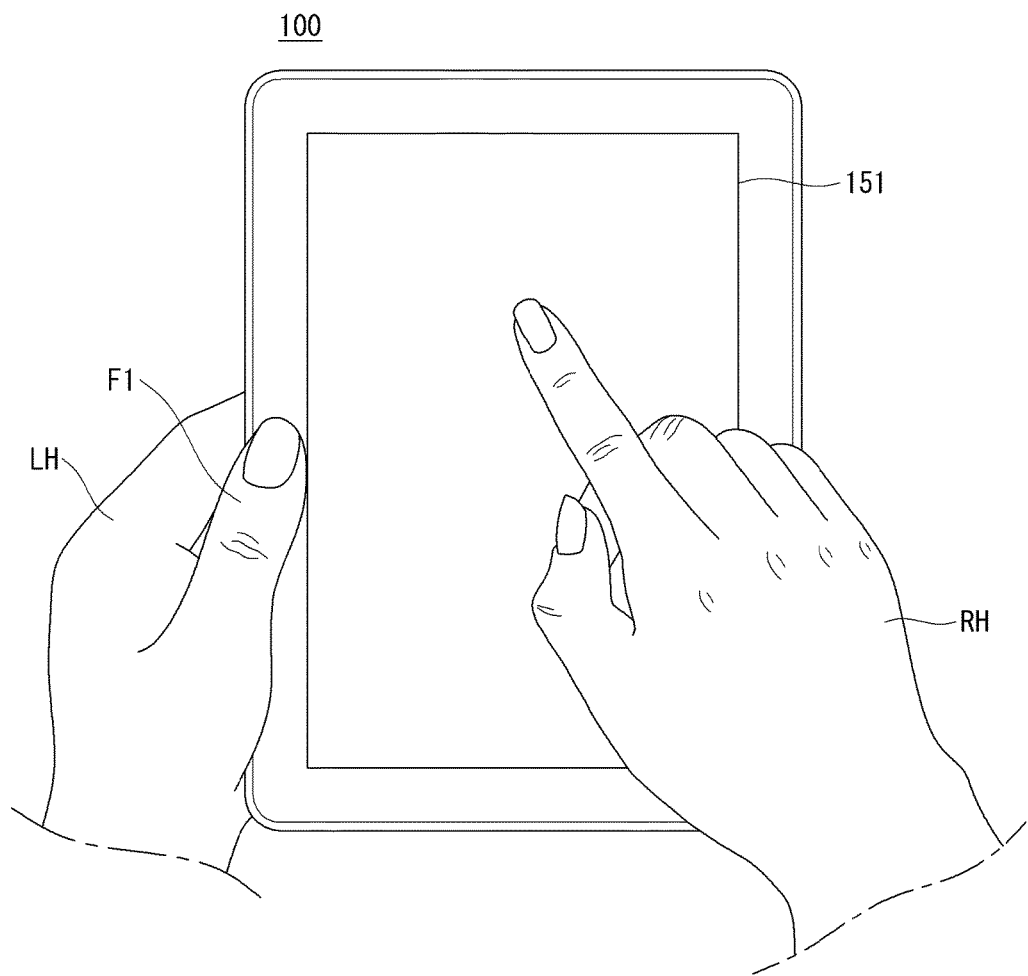
FIGS. 6 and 7 are views showing a touch action on the mobile terminal of FIG. 1.
Figure 7:
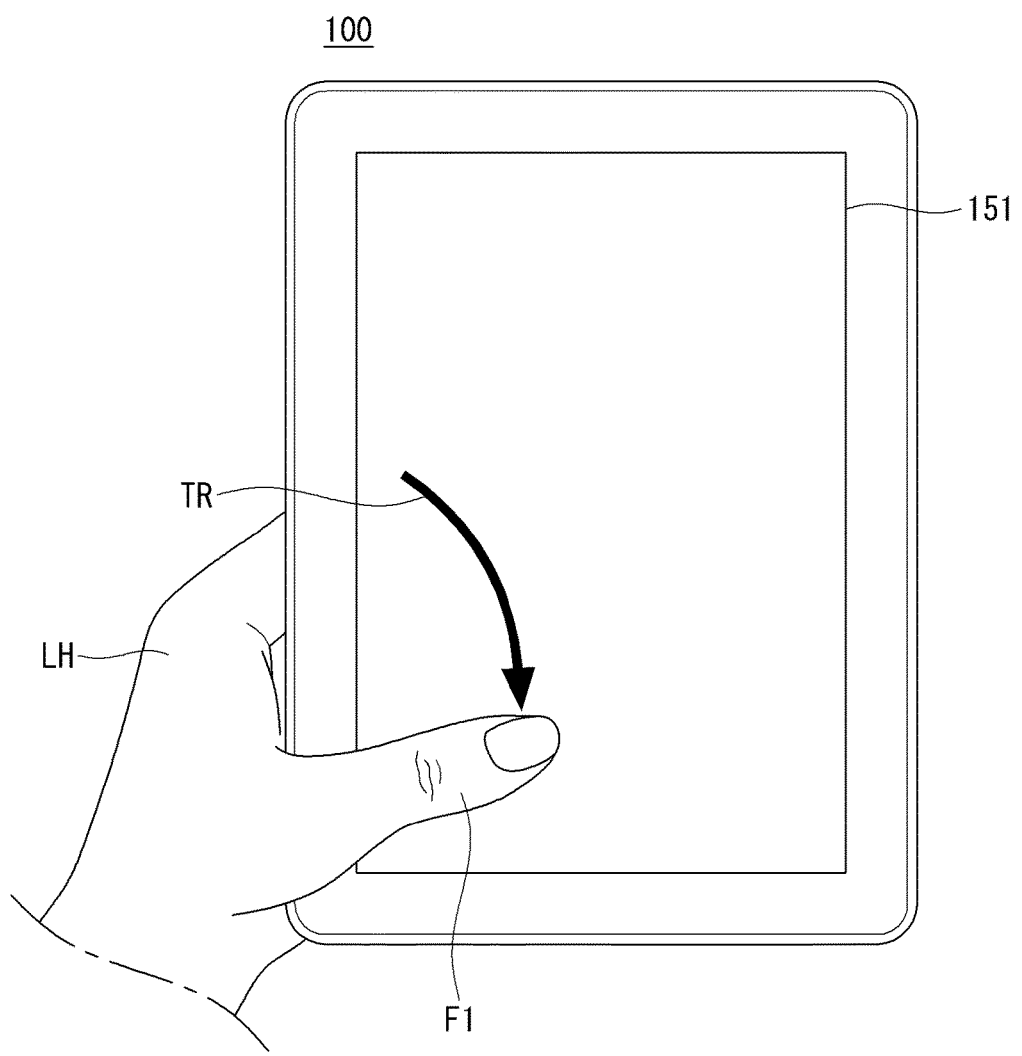

FIGS. 6 and 7 are views showing a touch action on the mobile terminal of FIG. 1.

As shown therein, the mobile terminal 100 according to one embodiment of the present invention may be manipulated by a user's touch action.

As shown in FIG. 6, the user may manipulate the mobile terminal 100 while holding it with both hands. That is, the mobile terminal may be held in the left hand LH, and an operation of touching the display 151 may be performed with the right hand RH. At this point, the display 151 has a width which is greater than the contact range of a finger. For example, the user has to move the hand itself, rather than spreading the finger at the current position, in order to select an object displayed on a left upper side or an object displayed on a right upper side.

The left hand LH is holding the mobile terminal 100. Accordingly, a touch action using the left hand LH indicates that a manipulation using only the first finger F1, i.e., the thumb, can be performed at the current position. Accordingly, it may not be easy to select the object on the right upper side of the display 151 using the first finger F1. The mobile terminal 100 according to one embodiment of the present invention may be properly manipulated by using the hand holding the mobile terminal 100.

As shown in FIG. 7, the user may perform a touch action y using the first finger F1 of the left hand LH holding the mobile terminal 100. The touch action may form a touch trajectory TR. Hereinafter, a touch trajectory TR generated by a user's touch action may be illustrated. However, the touch trajectory TR is not actually displayed on the display 151, but the touch trajectory TR is an indication of along which a touch action occurs to help clear understanding.

The touch trajectory TR may be close to the position of the left hand LH holding the mobile terminal 100. That is, the touch trajectory TR may be positioned within areas more towards one side from the central area of the display 151, like left lower, right lower, left upper, and right upper areas of the display 151.

The touch trajectory TR may be long in a vertical or horizontal direction. This can be clearly understood when considering the moving range of the first finger of the left hand LH holding the mobile terminal 100. That is, a touch trajectory TR long in a vertical direction may be generated by moving the first finger FA, with one of both lateral sides of the mobile terminal held in the left hand LH, and a touch trajectory TR long in a horizontal direction may be generated by moving the first finger F1, with one of upper and lower sides of the mobile terminal in the left hand LH.

The touch trajectory TR may be in the shape of an arc. That is, the touch trajectory TR may not be linear. Also, this means that the touch trajectory TR may be curved towards the central direction of the display 151. This can be clearly understood when considering that the first finger F1 moves centered on the left hand LH holding the mobile terminal 100.

If the touch trajectory TR is long in breadth or length and is in the shape of an arc, the controller 180 may determine that the mobile terminal 100 is touched with a finger of the hand holding the mobile terminal 100. Also, the controller 180 may determine how far the finger can reach, based on at least either one of the position and trace of the touch trajectory TR.

Figure 8:
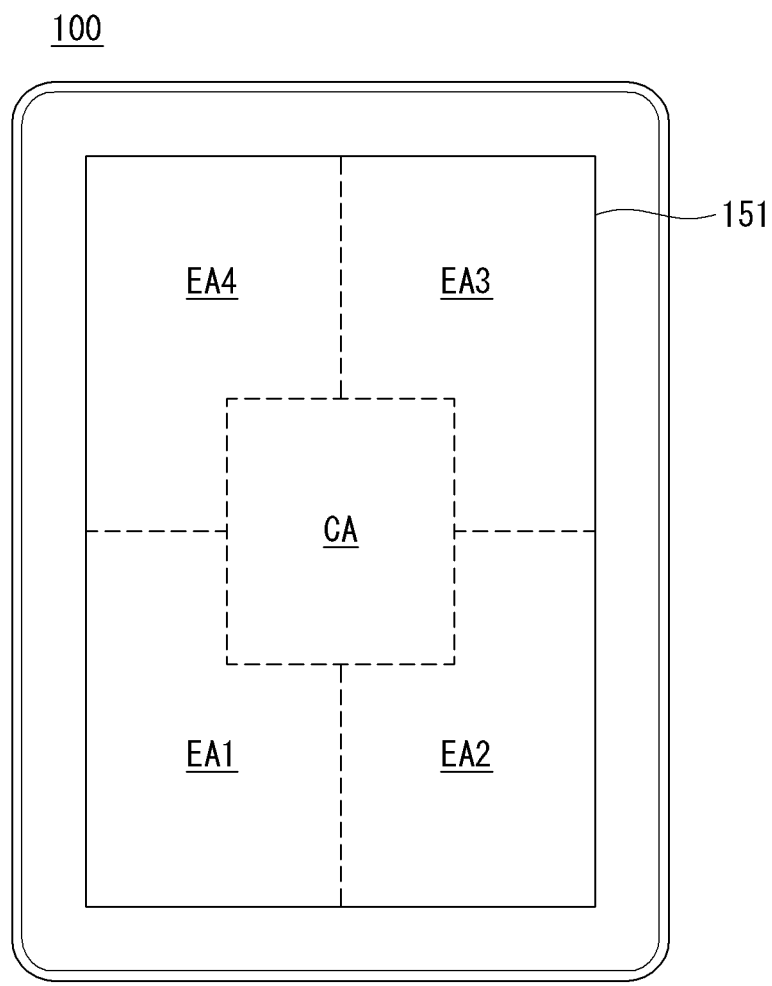
FIGS. 8 and 9 are views showing areas of the mobile terminal of FIG. 1.
Figure 9:
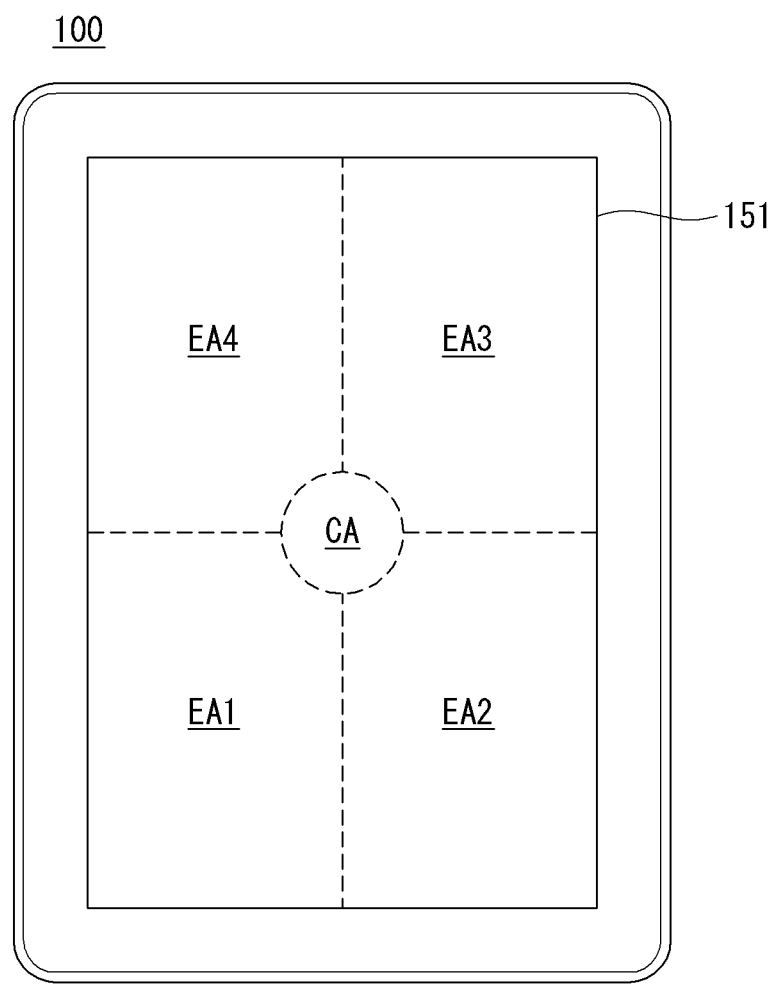

FIGS. 8 and 9 are views showing areas of the mobile terminal of FIG. 1.

As shown therein, the display 151 of the mobile terminal 100 according to one embodiment of the present invention may be divided into a plurality of virtual areas.

As shown in FIG. 8, the display 151 may be divided into a center area CA and edge areas EA1 to EA4 around the center area CA.

The center area CA may be an area including a virtual center point of the display 151.

The edge areas EA1 to EA4 may be areas along the outer periphery of the center area CA. Each of the edge areas EA1 to EA4 may be an area including each of the edges of the display 151.

The controller 180 may distinguish the center area CA and the edges areas EA1 to EA4. After distinguishing them, the controller 180 may determine in which area a touch occurs, upon receipt of a touch action input, based on at least either one of the position and trace of the touch action.

As shown in FIG. 9, the range of the center area CA may be varied. That is, the range of the center area CA may be set to have a rectangular shape, as shown in FIG. 8, or a round shape, as shown in FIG. 9.

FIGS. 10 to 13 are views showing a touch action on the mobile terminal of FIG. 1.

As shown therein, the mobile terminal 100 according to one embodiment of the present invention may perform an operation in response to a touch action using one hand.

As shown in (a) of FIG. 10, the user may touch the first edge area EA1 of the display 151 with the first finger F1 of the left hand LH. The first finger F1 may be the thumb of the left hand LH.

As shown in (b) of FIG. 10, the user may touch the second edge area EA2 of the display 151 with the second finger F2 of the right hand RH. The second finger F2 may be the thumb of the right hand RH.

When the mobile terminal 100 is being held in the left hand LH, the first edge area EA1 is usually touched, and when the mobile terminal 100 is held in the right hand RH, the second edge area EA2 may be usually touched. Therefore, the controller 180 may determine whether in which hand the mobile terminal 100 is being currently held and/or whether the user is right-handed or left-handed, based on a touched area.

Figure 11:
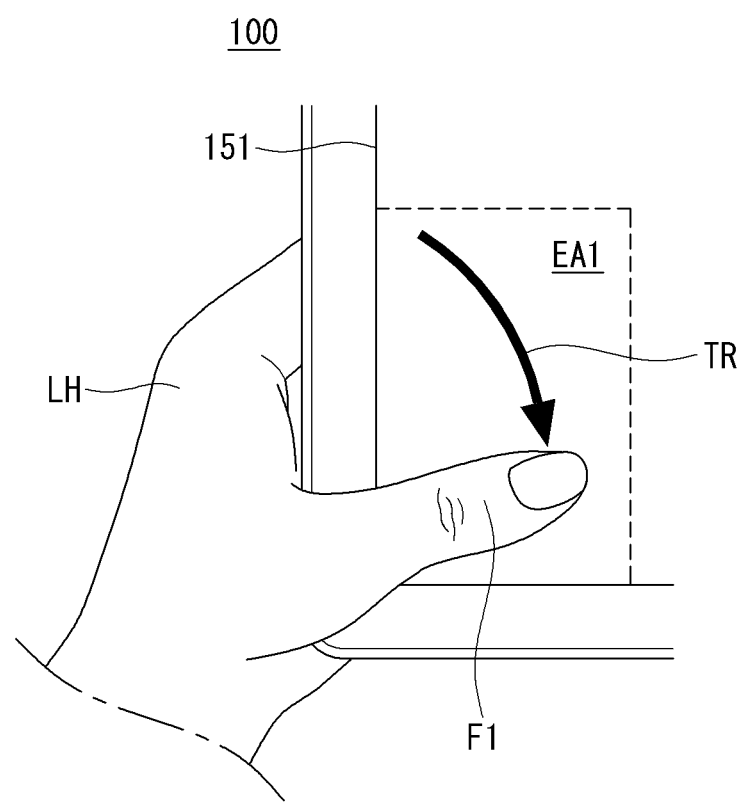

As shown in FIG. 11, the user may touch the mobile terminal 100 with the left hand LH. For example, a touch trajectory TR of the first finger F1 of the left hand LH may be formed within the first edge area EA1.

As shown in (a) of FIG. 12, the touch trajectory TR may be long in a vertical direction. For example, a touch action may be performed with a finger of the hand holding a lateral side of the mobile terminal 100.

When a touch trajectory TR long in a vertical direction is input, the controller 180 may set a touch range TA within which the user can touch with one hand. For example, the touch range TA may be a range inside the input touch trajectory TR, or a predetermined range including the input touch trajectory TR.

As shown in (b) of FIG. 12, the touch trajectory TR may be long in a horizontal direction. For example, a touch action may be performed with a finger of the hand holding a lower surface of the mobile terminal 100.

When a touch trajectory TR long in a horizontal direction is input, the controller 180 may set a touch range TA within which the user can touch with one hand, and may determine that the user can touch with one hand within the touch range TA.

As shown in (a) and (b) of FIG. 13, the touch trajectory TR may correspond to a touch action which is performed clockwise or counterclockwise. The controller 180 may perform different control operations depending on the direction of the touch trajectory TR. For example, a clockwise touch trajectory TR is input, a control window may be displayed, and when a counterclockwise touch trajectory TR is input, the displayed control window may disappear.

Figure 14:
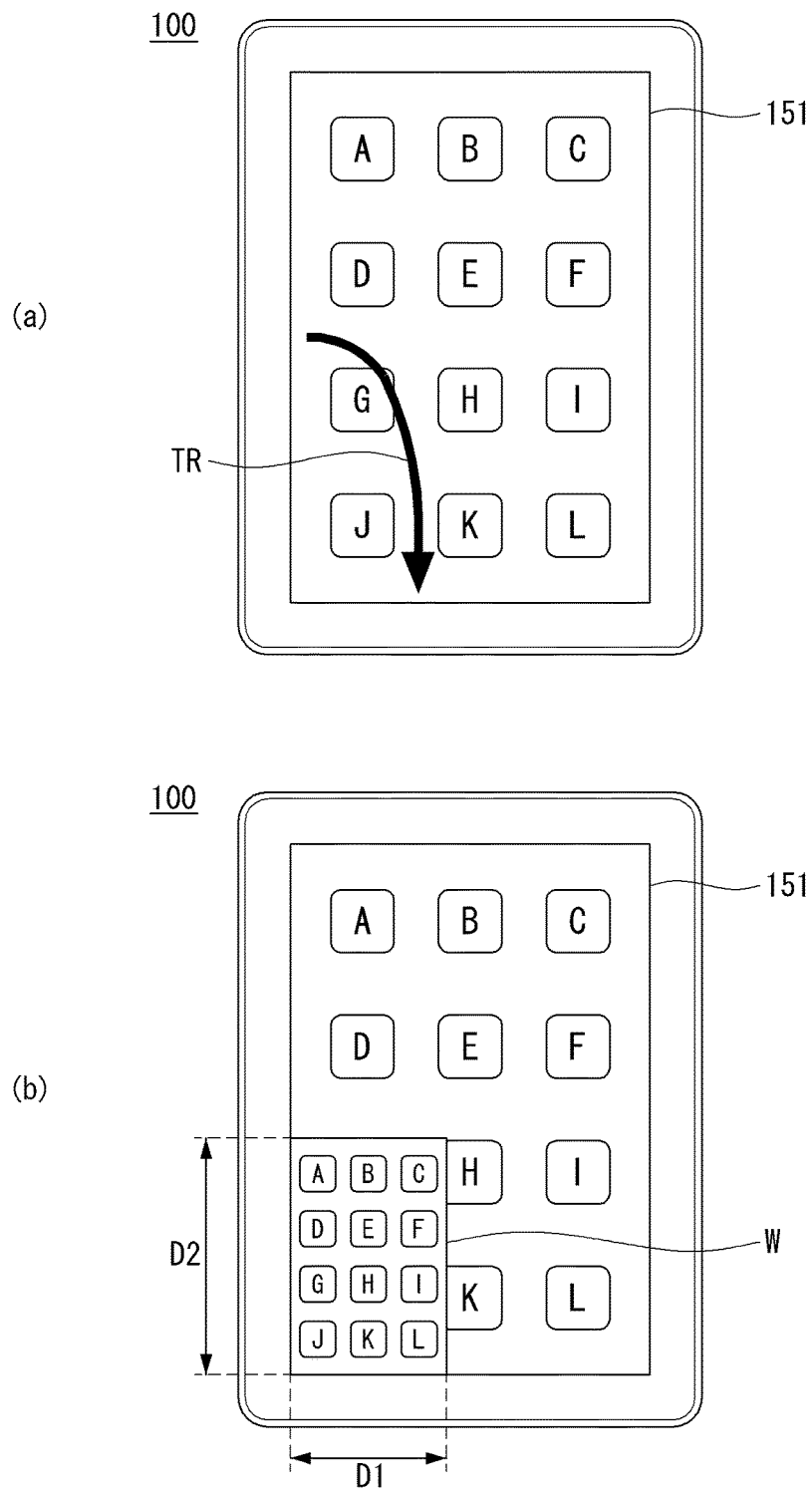
Figure 16:
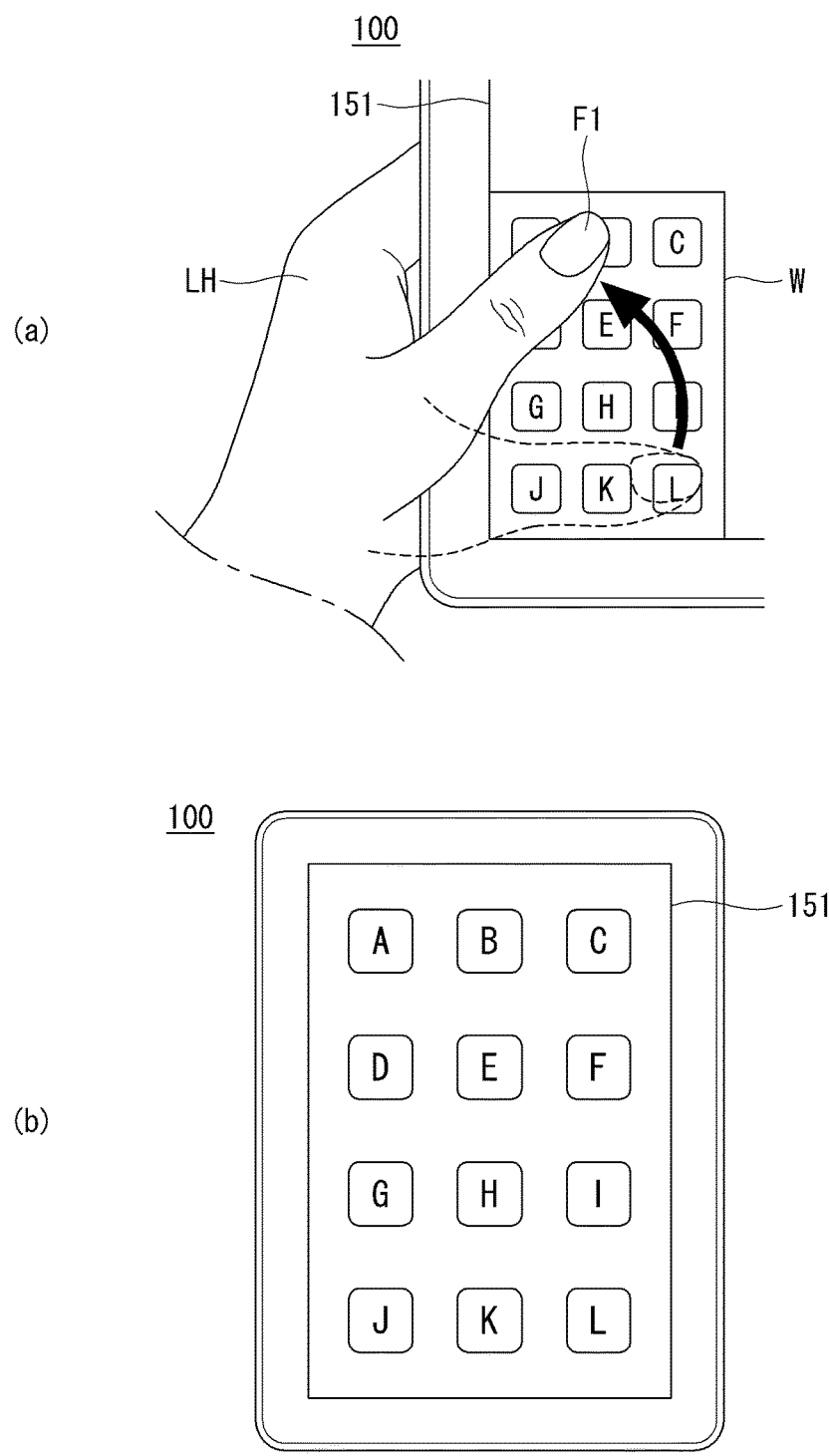

FIGS. 14 to 16 are views showing a control window being displayed by a touch action on the mobile terminal of FIG. 1.

As shown therein, the mobile terminal 100 according to one embodiment of the present invention may selectively display a control window W in response to a user's touch action.

As shown in (a) of FIG. 14, a touch trajectory TR which is clockwise and has an arc shape may be input by a user's touch action.

As shown in (b) of FIG. 14, when a user's touch action is input, the control window 180 may display a corresponding control window W.

The size of the control window W may be determined corresponding to the touch action. For example, the horizontal length D1 and/or vertical length D2 of the control window W may be determined based on the touch range (TA of FIG. 12) determined depending on the touch trajectory TR.

The content that has been displayed on the display 151 before the control window W is displayed may be displayed in the control window W. That is, the current screen may be cut down in size and displayed in the control window W. The user may move its hand and select not the item C on the right upper end of the display 151 but instead the item C displayed in the control window W, and perform the operation corresponding to the item C.

As shown in (a) of FIG. 15, the user may touch each item in the control window W with the first finger F1. That is, the user may properly control the mobile terminal 100 with the first finger F1 while keeping the left hand in place, holding the mobile terminal 100.

As shown in (b) of FIG. 15, because the control window W is displayed considering the moving range of the first finger F1, the user may select each item in the control window W by moving the first finger F1.

As shown in (a) of FIG. 16, the user may perform a counterclockwise touch action with the first finger F1.

As shown in (b) of FIG. 16, when the user performs a counterclockwise touch action, the display of the control window W may be cancelled. Also, the control window W may be provided with a display cancellation button (not shown) for making the display of the control window W disappear.

Figure 17:
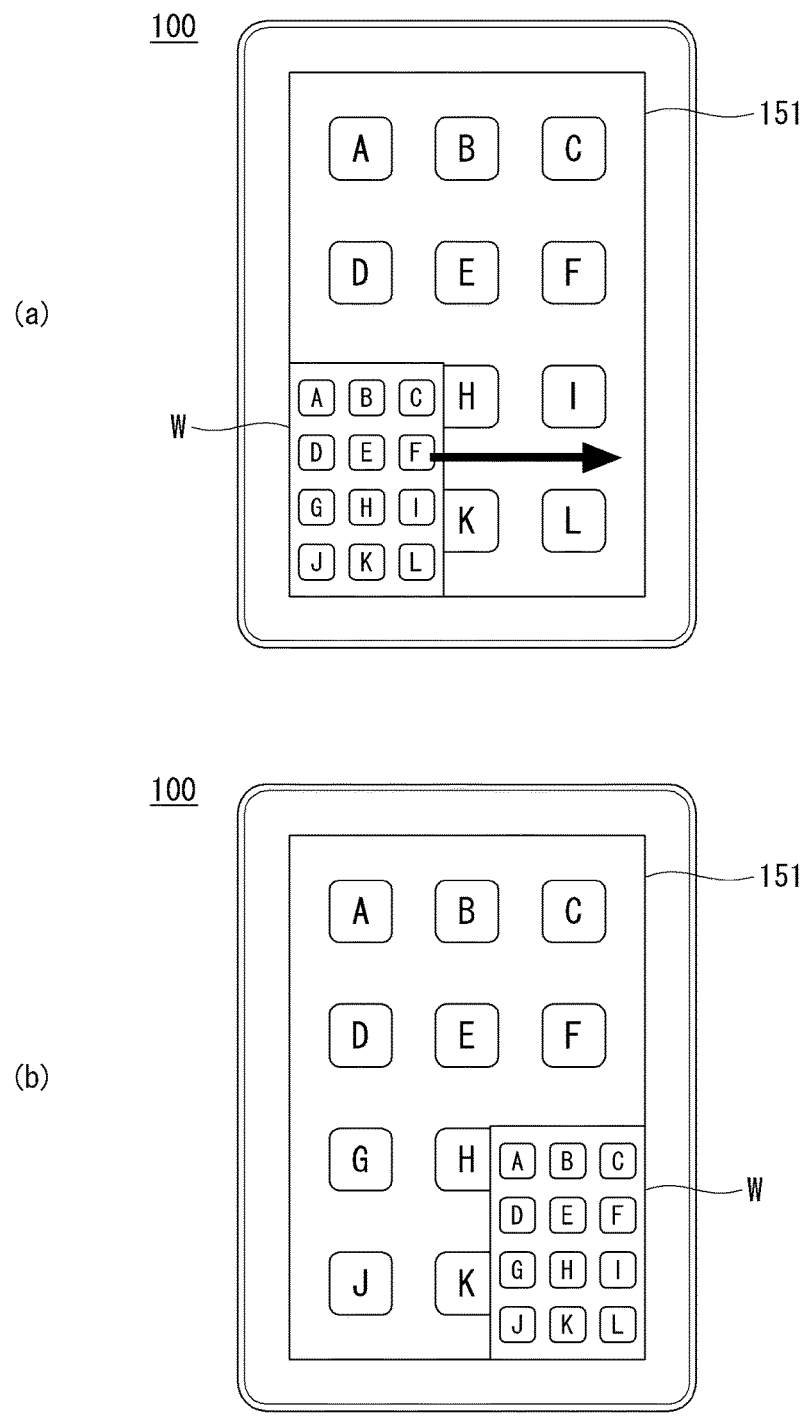
FIG. 17 is a view showing a change in the position of the control window in response to a touch action on the mobile terminal of FIG. 1.

FIG. 17 is a view showing a change in the position of the control window in response to a touch action on the mobile terminal of FIG. 1.

As shown therein, the controller 180 of the mobile terminal 100 according to one embodiment of the present invention may change the position of the displayed control window W according to a user's selection.

As shown in (a) of FIG. 17, the control window W may be positioned on a left lower edge of the display 151. For example, if the user performs a touch action while holding a lateral side of the mobile terminal 100, the control window W may be displayed at the displayed position. With the control window W displayed, the user may perform a drag touch action DT from the left to the right of the display 151.

As shown in (b) of FIG. 17, when a user's dragging touch action DT is input, the controller 180 may change the position of the control window W and display it in response to the dragging touch action. The position of the control window W may be changed in response to the user's dragging touch action DT. For example, if the drag and touch action DT is performed upward, the control window W may be displayed at an upper side of the display 151, and if the drag and touch action DT is performed in a diagonal direction, the control window W may be displayed on a diagonal line of the display 151.

FIGS. 18 to 21 are views showing a method of manipulating the control window of the mobile terminal of FIG. 1.

As shown therein, the mobile terminal 100 according to one embodiment of the present invention may manipulate the content and/or application displayed on the display 151 by manipulating the control window W.

Figure 18:
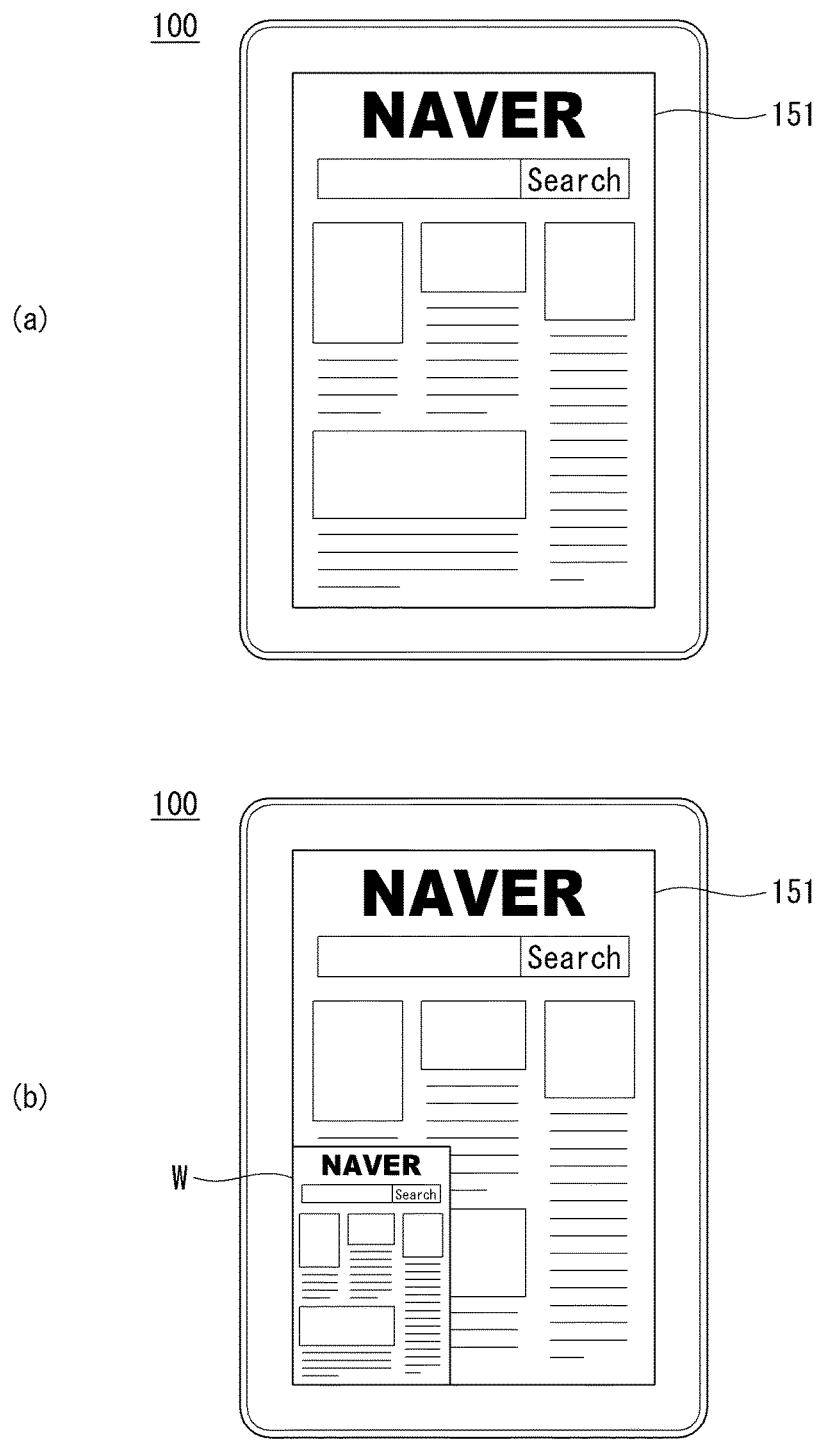
FIGS. 18 to 21 are views showing a method of manipulating the control window of the mobile terminal of FIG. 1.

As shown in (a) of FIG. 18, a webpage may be displayed on the display 151. For the sake of better understanding, the following description will be given of an example where webpage content is displayed on the display 151. It will be obvious that the mobile terminal 100 according to the present invention is not applicable only to the webpage content.

As shown in (b) of FIG. 18, the control window W may be displayed based on a user's touch action. The control window W may be a cutdown version of the webpage displayed on the display 151.

Figure 19:
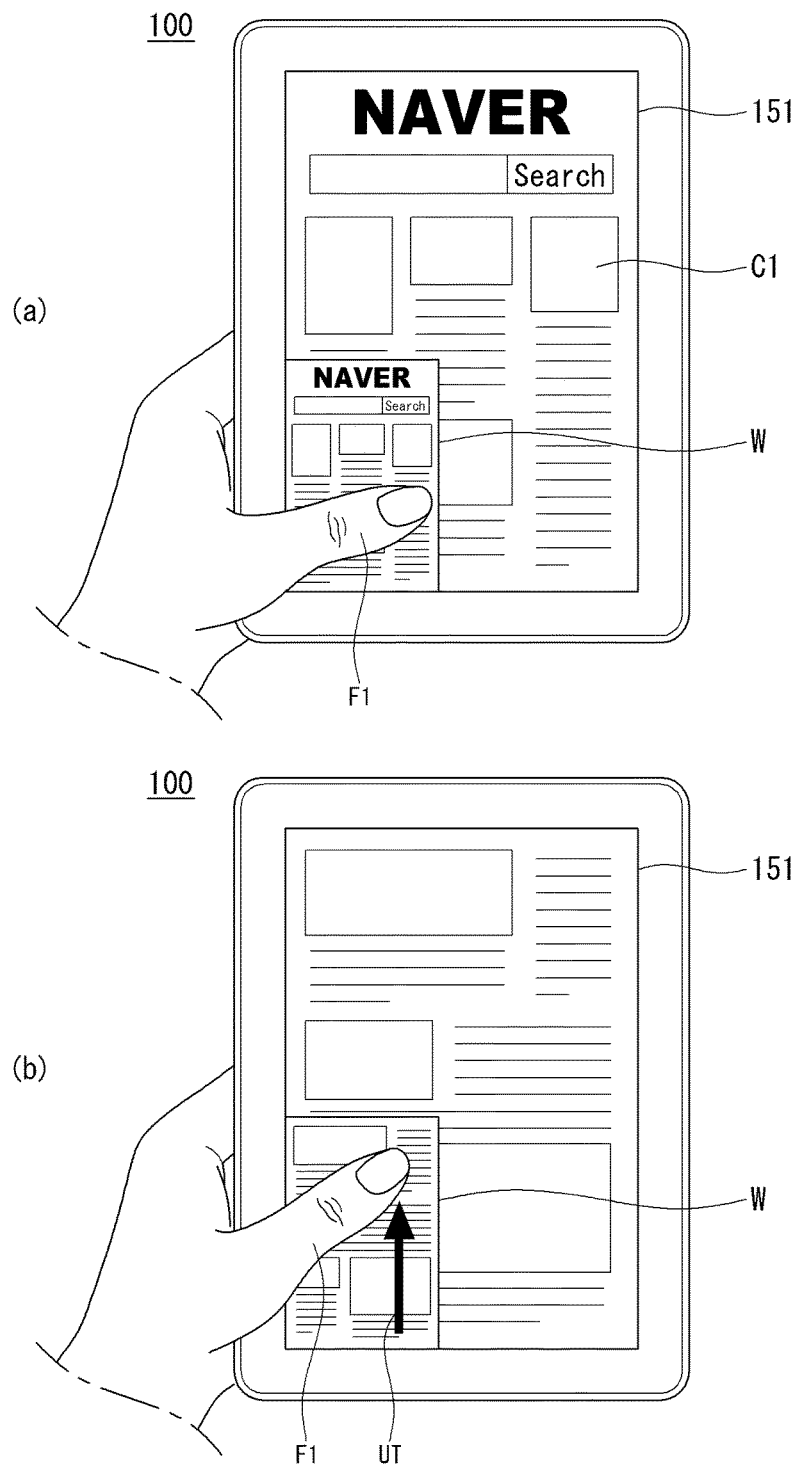

As shown in (a) of FIG. 19, the user may select a specific item of the control window W with the first finger F1. The selected item may correspond to a specific position on the webpage content displayed on the display 151. For example, if a specific point in the control window W corresponds to the item C1, this means that the item C1 is selected. If a link is set for the selected item C1, the screen may be changed to correspond to the link.

As shown in (b) of FIG. 19, the user may perform an upward touch action UT within the control window W with the first finger F1. When the upward touch action UT is performed, the controller 180 may change the displayed webpage content and display it to correspond to the upward touch action UT.

Figure 20:
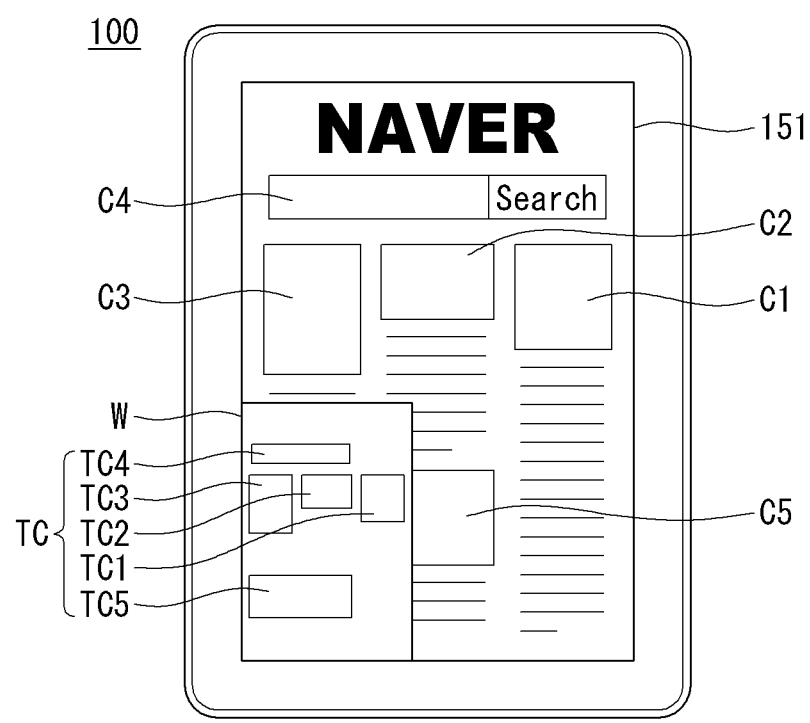

As shown in FIG. 20, only items selectable from the webpage content displayed on the display 151 may be selectively displayed in the control window W. For example, if selectable items C1 to C5 exist on the webpage, corresponding thumbnail items TC1 to TC5 may be displayed in the control window W. By selectively displaying selectable thumbnail items, rather than the entire webpage content, this makes it easier to identify and/or select items displayed in the control window W.

Figure 21:
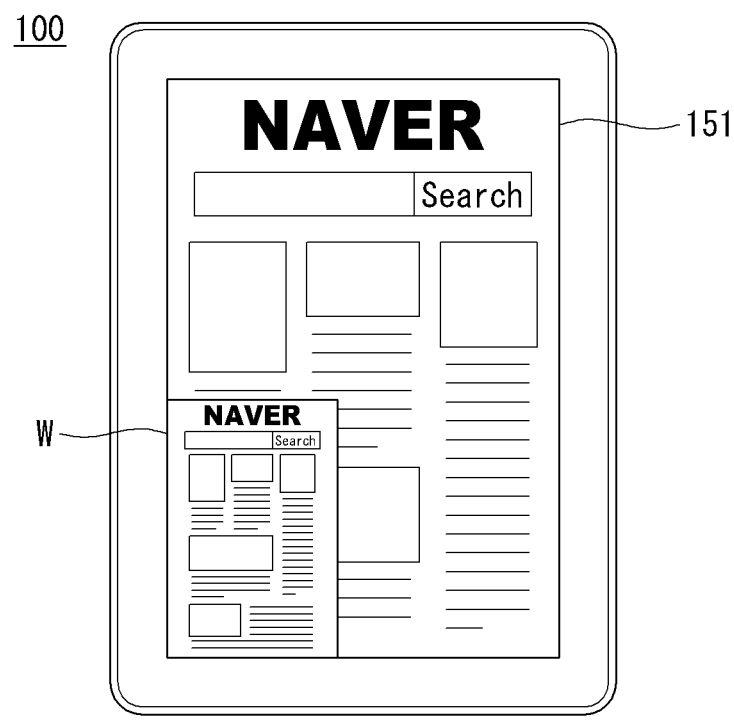

As shown in FIG. 21, the entire webpage content including both the portion displayed on the display 151 and the portion not displayed thereon may be displayed in the control window W. That is, although the entire webpage content is not displayed on the display 151 due to the limited size of the display 151, the entire webpage content including the non-displayed portion may be displayed in the control window W. Accordingly, the user can easily find out how the currently displayed area or position looks in the entire webpage content.

Figure 22:
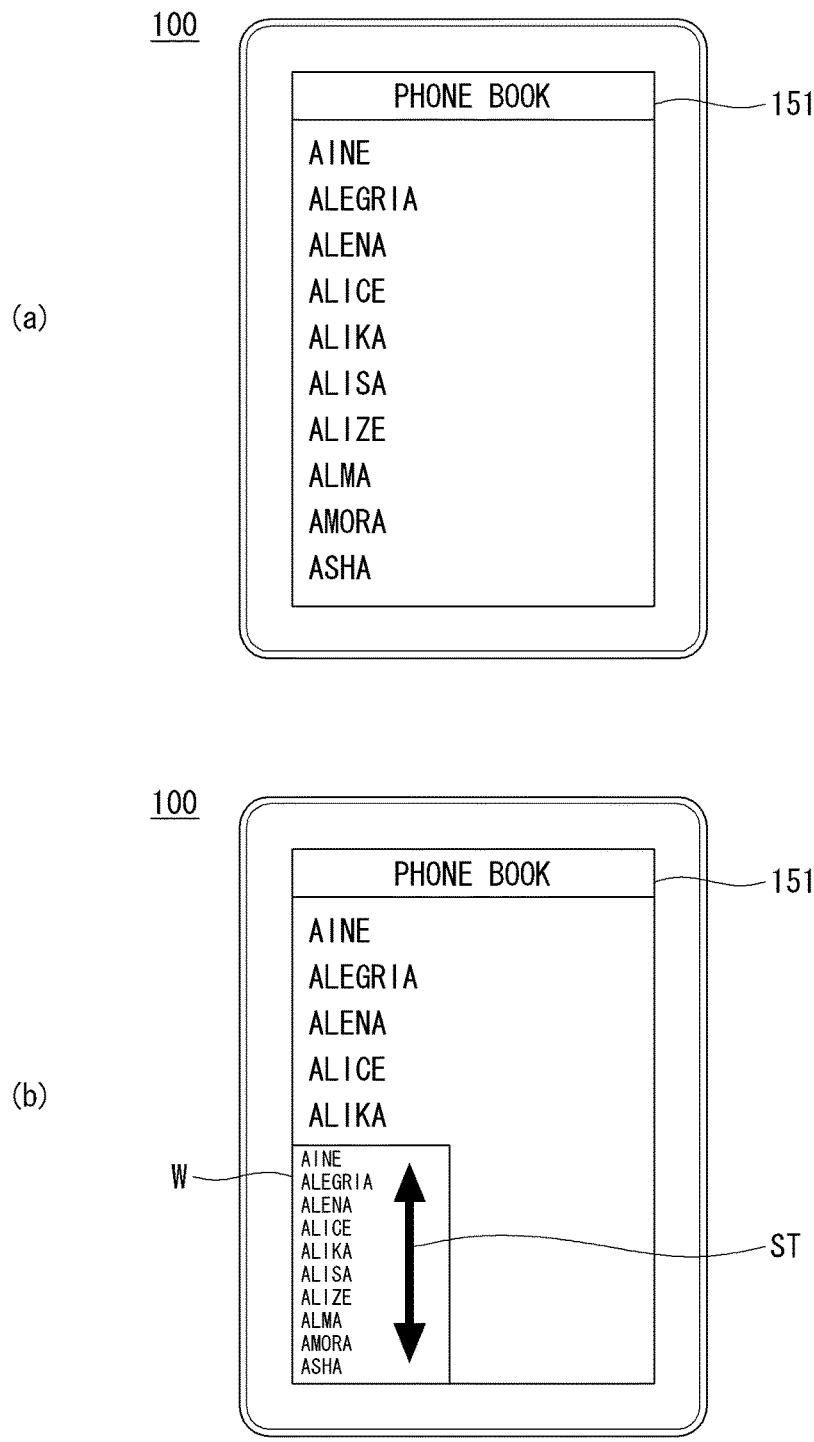
FIG. 22 is a view showing a method of manipulating a phonebook of the mobile terminal of FIG. 1.

FIG. 22 is a view showing a method of manipulating a phonebook of the mobile terminal of FIG. 1.

AS shown therein, the controller 180 of the mobile terminal 100 according to one embodiment of the present invention may display the control window W in such a way that displayed information is searched faster and more efficiently.

As shown in (a) of FIG. 22, a contact list, which is a type of information, may be displayed on the display 151.

As shown in (b) of FIG. 22, the controller 180 may display the control window W based on a user's touch action. The content list displayed on the display 151 may be cut down in size and displayed in the control window W. The user may perform an up-down touch action ST within the control window W.

When a touch action ST is input, the controller 180 may perform a corresponding operation. For example, the controller 180 may perform an operation of scrolling up and down the displayed contact list.

FIG. 23 is a view showing a video operation method for the mobile terminal of FIG. 1.

As shown therein, the mobile terminal 100 according to one embodiment of the present invention may display a control window W for receiving a control operation for the content displayed on the display 151.

As shown in (a) of FIG. 23, video may be displayed on the display 151.

As shown in (b) of FIG. 23, an adjustment bar PB may be displayed in the displayed control window W. The user may adjust the volume, playback position, speed, etc of the video being played by the adjustment bar PB.

FIGS. 24 and 25 are view showing an application selection method for the mobile terminal of FIG. 1.

As shown therein, the controller 180 of the mobile terminal 100 according to one embodiment of the present invention may provide a user interface where running applications are presented upon a touch action input and the user can easily select an application among them to run in the foreground.

As shown in (a) of FIG. 24, the user may perform a touch action in such a way that a touch trajectory TR larger than a threshold value CTL may be input.

As shown in (b) of FIG. 24, when a touch trajectory TR larger than a threshold value CTL is input, the controller 180 may display items EA corresponding to a currently running application. Alternatively, the controller 180 may display items EA corresponding to a runnable application.

As shown in (a) of FIG. 25, the user may perform a touch action of selecting a specific one of the displayed items EA.

As shown in (b) of FIG. 25, when the user selects a specific item IE, the controller may display an application corresponding to the selected item EA on the display 151. That is, the controller 180 may control the selected item EA to run in the foreground.

Figure 27:
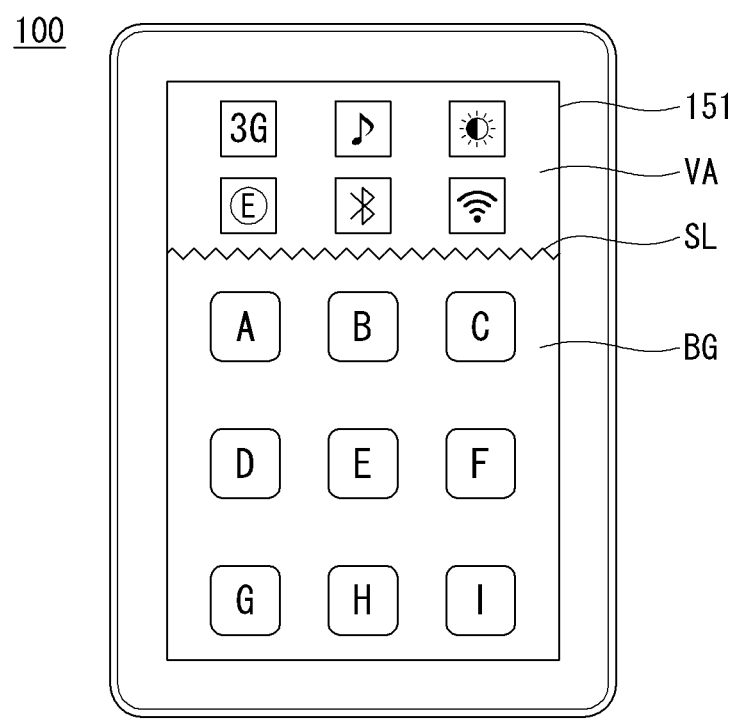

FIGS. 26 and 27 are views showing a background operation method for the mobile terminal of FIG. 1.

As shown therein, the controller 180 of the mobile terminal 100 according to one embodiment of the present invention may change the position of an item displayed on the display 151 in response to a touch action.

As shown in (a) of FIG. 26, the user may perform a downward touch action with the first finger F1 while holding the mobile terminal 100.

As shown in (b) of FIG. 26, when the user performs a downward touch action, the controller 180 may control the background BG to be shifted downward and fixed. That is, the displayed background BG may be shifted downward, and the area from which the background BG is shifted may be displayed as a void area VA.

The controller 180 may display a boundary area SL which appears to be torn between the shifted background BG and the void area VA. Also, the controller 180 may give a vibration and sound effect when the background BG is shifted according to a user's touch action and makes the user recognize that the background BG is shifted and fixed. For example, the user may hear a sound as if a gear is turning or paper is being torn and clearly perceive that the relevant function is being executed.

When an upward touch action is performed, the controller 180 may change the display of the background BG so as to correspond to the upward touch action. For example, the fixed background BG may return to the original state.

As shown in FIG. 27, the controller 180 may display information indicative of the state, etc of the mobile terminal 100. For example, a short-cut menu, etc for easily controlling the communication function, etc of the mobile terminal 100.

Figure 28:
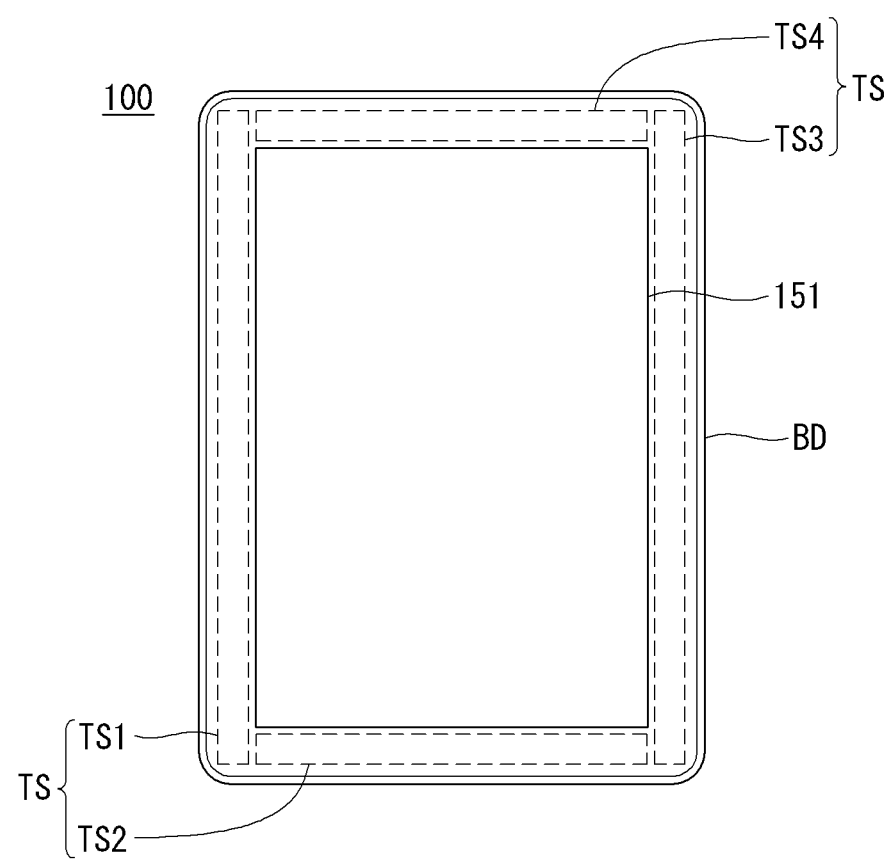
FIG. 28 is a view showing a mobile terminal according to yet another embodiment of the present invention.

FIG. 28 is a view showing a mobile terminal according to yet another embodiment of the present invention.

As shown therein, the mobile terminal 100 according to yet another embodiment of the present invention may be configured such that a detection sensor TS for detecting a user's holding motion may be positioned on a bezel BD.

The detection sensor TS may be a sensor provided on the bezel BD of the mobile terminal 100. The detection sensor TS may detect that the bezel BD is being held. For example, the detection sensor TS may be a detection sensor for detecting a pressure of the hand holding the bezel BD and/or a temperature sensor for detecting a temperature of the hand holding the bezel BD. The detection sensor TS may be positioned at each portion of the bezel BD. That is, first to fourth detection sensors TS1 to TS4 may be positioned on upper, lower, left, and right sides of the bezel BD.

FIG. 29 is a view showing the mobile terminal of FIG. 28 being held in a hand.

As shown therein, the mobile terminal 100 according to one embodiment of the present invention may detect that the mobile terminal 100 is being held.

As shown in (a) of FIG. 29, the user may hold the mobile terminal 100 with the left hand LH. If the mobile terminal 100 is held in the left hand LH, the left bezel BD may be normally held in the left hand LH. The fact that the left bezel BD is held may be detected by the first detection sensor TS.

As shown in (b) of FIG. 29, the user may hold the mobile terminal 100 with the right hand RH. The fact that the mobile terminal 100 is held in the right hand RH may be detected by the third detection sensor TS.

Figure 30:
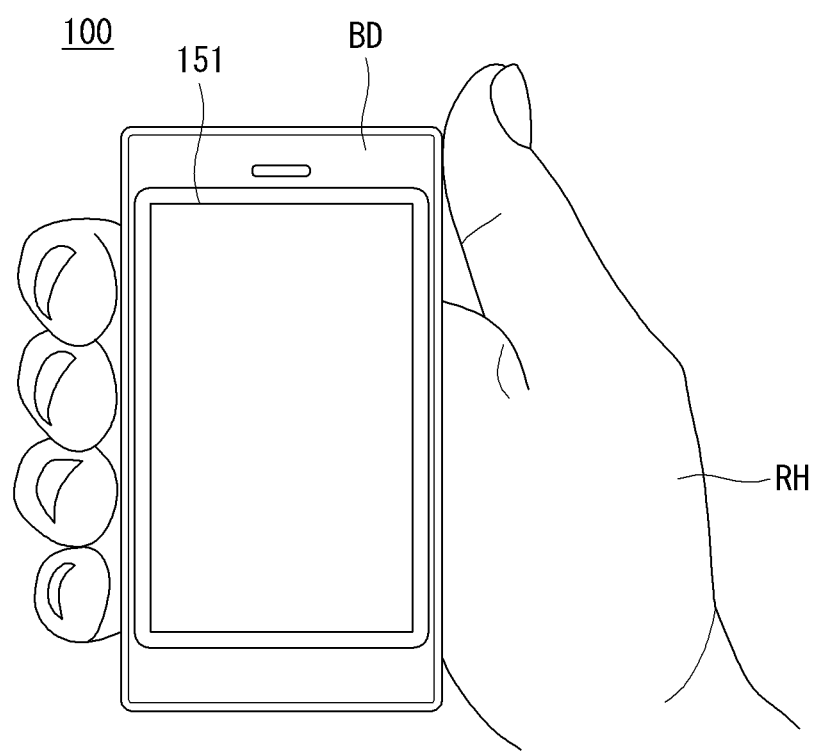
FIG. 30 is a view showing a mobile terminal according to a further embodiment of the present invention.

FIG. 30 is a view showing a mobile terminal according to a further embodiment of the present invention.

As shown therein, the mobile terminal 100 may be of a size small enough to hold with the user's one hand by the bezel. As described above, a bezel BD may incorporate a detection sensor TS therein.

Even when the user holds the mobile terminal 100 of a relatively small size with the right hand RH, this may be detected by the detection sensor TS.

Based on a result of detection by the detection sensor TS, the controller 180 may determine with which hand the user is holding the mobile terminal 100. That is, the controller may determine with which hand the user is holding the mobile terminal 100, based on the pressure and/or temperature of each finger and/or the palm. For example, if the user holds the mobile terminal 100 with the right hand RH, the left bezel BD is held with the four fingers of the right hand RH, and the right bezel BD is held with the thumb. Further, the palm will wrap all around the rear of the mobile terminal 100. The detection sensor TS may detect a holding motion of the right hand RH, and based on this, the controller 180 may determine which hand is holding the mobile terminal 100.

FIG. 31 is a view showing an operation of a mobile terminal according to a further embodiment of the present invention.

As shown therein, the mobile terminal 100 according to a further embodiment of the present invention may display the control window W in response to a user's touch action.

As shown in (a) of FIG. 31, the user may be holding the mobile terminal 100 with the left hand LH. When the mobile terminal 100 is held in the left hand LH, the controller 180 may detect the hand holding the mobile terminal 100 and the held position of the mobile terminal 100 by the detection sensor TS of the bezel BD. For example, based on the held position, it may be determined that the user is holding the mobile terminal 100 with the left hand LH.

The user may touch a specific point on the display 151 with the first finger F1. That is, the user may perform an operation of touching down at a specific point and then touching up on the specific point, rather than dragging or flicking touch action.

If there is a user's touch, the controller 180 may detect the position of the user's touch. For example, the position of the user's touch may be at a distance of D1 in breadth and D2 in length from where the user is holding the mobile terminal 100.

As shown in (b) of FIG. 31, the controller 180 may display a control window W based on the user's touch point. For example, a control window W which is D1 in breadth and D2 in length may be displayed. When the control window W is displayed at this size, the control window W may be displayed within the movement radius of the user's fingers. Therefore, an icon within the control window W may be selected without moving the hand holding the mobile terminal 100 a large distance or without using the other hand.

FIG. 32 is a view showing an operation of a mobile terminal according to a further embodiment of the present invention.

As shown therein, the mobile terminal 100 according to a further embodiment of the present invention may display a control window W with respect to a user's touch point.

As shown in (a) of FIG. 32, the user may touch a specific point on the display 151 while holding the mobile terminal 100 with the right hand RH. For example, the user may touch the display 151 with the second finger F2. The controller 180 may detect the type and/or position of the user's hand holding the mobile terminal 100 by the detection sensor TS, etc of the bezel BD.

As shown in (b) of FIG. 32, the controller 180 may display the control window W with respect to a touch point TP. For example, an operation of displaying the control window W based on the touch point TP may be performed.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A mobile terminal comprising:
a bar type body including a front surface and a rear surface;
a camera positioned on the front surface, wherein the camera is positioned at an upper portion of the bar type body;
a user input unit positioned on the front surface, wherein the user input unit is positioned at a lower portion of the bar type body;
a display, positioned between the camera and the user input unit, on the front surface; and
a controller configured to:
display, on the display, a first image having a shape of a grid as a whole, the first image including a plurality of icons, the plurality of icons including a first set of the icons and a second set of the icons,
receive a first predetermined input on the display,
in response to receiving the first predetermined input, move, on the display, at least the first set of the icons in a direction from the camera toward the user input unit and remove the second set of the icons from the display, and display, on the display, a second image that includes the first set of the icons without display, on the display, of the removed second set of the icons, wherein the first set of the icons is left within the display based on the move of the first set of the icons, the first set of icons are arranged at a predetermined interval, and the second set of the icons are arranged at a predetermined interval.

2. The mobile terminal of claim 1, wherein at least a part of the front or rear surfaces is formed as metal.

3. The mobile terminal of claim 1, wherein a size of every one of the first set of the icons is same as a size of every one of the second set of the icons.

4. The mobile terminal of claim 1, wherein the controller is configured to:

move the first set of the icons towards the camera and display the second set of the icons, when the controller obtains a second predetermined input, and display, on the display, a third image that includes the first set of the icons and the second set of the icons.

5. The mobile terminal of claim 1, wherein when the controller displays the second image that includes the first set of the icons without the second set of the icons, a void area is displayed on the display between the camera and the first set of the icons.

6. The mobile terminal of claim 1, wherein the controller displays at least one of a communication state or a short-cut menu on the display, between the camera and the first set of the icons, when the controller moves the first set of the icons.

7. A mobile terminal comprising:

a bar type body including a front surface and a rear surface;

a camera positioned at the front surface, wherein the camera is positioned at an upper portion of the bar type body;

a user input unit positioned at the front surface;

a display at the front surface; and a controller configured to:

display, on the display, a first image having a shape of a grid as a whole, the first image including a plurality of icons, the plurality of icons including a first set of icons and a second set of icons, in response to receiving a first input, move at least the first set of icons of the first image towards put a lower portion of the bar type body and remove the second set of icons of the first image, and display, on the display, a second image based on the move of the first set of icons and the remove of the second set of icons, the second image including the first set of icons of the first image left on the display without including the second set of icons, wherein the first set of the icons are arranged at a predetermined interval, and the second set of icons are arranged at a predetermined interval.

8. The mobile terminal of claim 7, wherein at least a part of the front or rear surfaces is formed as metal.

9. The mobile terminal of claim 7, wherein a size of every one of the first set of icons is same as a size of ever one of the second set of icons.

10. The mobile terminal of claim 7, wherein the controller is configured to:

move the first set of icons towards the camera and display the second set of icons, when the controller obtains a second input, and wherein a third image is displayed, on the display, the third image including the first set of icons and the second set of icons.

11. The mobile terminal of claim 7, wherein when the controller displays the second image that includes the first set of icons without the second set of icons, a void area is displayed on the display between the camera and the first set of icons.

12. The mobile terminal of claim 7, wherein the controller displays at least one of a communication state or a short-cut menu on the display, between the camera and the moved first set of icons, when the controller moves the first set of icons.

* * * * *